United States Patent
Cote et al.

(10) Patent No.: US 10,704,883 B2
(45) Date of Patent: Jul. 7, 2020

(54) STRAIN SENSOR WITH MEASUREMENT DISCRIMINATION ACCORDING TO THE DEFORMATION DIRECTION

(71) Applicants: ETAT FRANÇAIS REPRESENTE PAR LE DELEGUE GENERAL POUR L'ARMEMENT, Paris (FR); SILMACH, Besançon (FR)

(72) Inventors: Thierry Cote, Gennes (FR); Vianney Sadoulet, Venise (FR); Patrice Minotti, Gennes (FR); Vincent Walter, Besançon (FR); Pascal Girardin, Montfaucon (FR)

(73) Assignees: ETAT FRANÇAIS REPRESENTE PAR LE DELEGUE GENERAL POUR L'ARMEMENT, Paris (FR); SILMACH, Besancon (FR)

( * ) Notice: Subject to any disclaimer, the term of this patent is extended or adjusted under 35 U.S.C. 154(b) by 157 days.

(21) Appl. No.: 16/082,142

(22) PCT Filed: Feb. 28, 2017

(86) PCT No.: PCT/FR2017/000036
§ 371 (c)(1),
(2) Date: Sep. 4, 2018

(87) PCT Pub. No.: WO2017/149211
PCT Pub. Date: Sep. 8, 2017

(65) Prior Publication Data
US 2019/0063895 A1 Feb. 28, 2019

(30) Foreign Application Priority Data
Mar. 2, 2016 (FR) ..................................... 16 00342

(51) Int. Cl.
*G01B 5/30* (2006.01)
*G01B 21/32* (2006.01)
(Continued)

(52) U.S. Cl.
CPC ............... *G01B 5/30* (2013.01); *G01B 21/32* (2013.01); *G01D 5/04* (2013.01); *G01L 1/00* (2013.01); *G01L 1/04* (2013.01)

(58) Field of Classification Search
None
See application file for complete search history.

(56) References Cited

U.S. PATENT DOCUMENTS 6,609,985 B2 * 8/2003 Todd ..................... F16H 7/0829
474/103
6,664,708 B2 * 12/2003 Shlimak ............ G06K 19/0675
310/313 R
(Continued)

FOREIGN PATENT DOCUMENTS

| EP | 1 998 145 A2 | 3/2008 |
| FR | 2 974 410 A1 | 10/2012 |
| WO | 2013/104738 A1 | 7/2013 |

OTHER PUBLICATIONS

International Search Report, dated Aug. 14, 2017, from corresponding PCT/FR2017/000036 application.
(Continued)

*Primary Examiner* — Natalie Huls
*Assistant Examiner* — Jermaine L Jenkins
(74) *Attorney, Agent, or Firm* — Young & Thompson

(57) ABSTRACT

A deformation passive sensor includes a system for detecting a variation in the distance between two points or regions of a structure, and a carrier having first and second parts configured to be fixed to the points or regions. The system includes a measuring assembly carried by the first part and
(Continued)

actuatable only in one measurement direction in order to measure and store a measurement associated with at least one deformation in a measurement direction, and an actuating device including an intermediary assembly having an actuating member for actuating the measuring assembly, and an actuating assembly having a push part facing the intermediary assembly and configured such that the actuating member is moved with respect to the measuring assembly only when the second part moves in the measurement direction.

20 Claims, 13 Drawing Sheets

(51) Int. Cl.
    *G01D 5/04*     (2006.01)
    *G01L 1/00*     (2006.01)
    *G01L 1/04*     (2006.01)

(56) References Cited

U.S. PATENT DOCUMENTS

| | | | |
|---|---|---|---|
| 6,994,245 B2 * | 2/2006 | Pinchot | B01J 19/0093 |
| | | | 165/166 |
| 7,768,161 B2 * | 8/2010 | Le Moal | H02N 1/008 |
| | | | 310/12.03 |
| 8,598,553 B2 * | 12/2013 | Appleby | B29C 33/3842 |
| | | | 250/505.1 |
| 9,140,584 B2 | 9/2015 | Louvigne et al. | |
| 9,712,085 B2 * | 7/2017 | Le Moal | H02N 1/008 |
| 9,882,510 B2 | 1/2018 | Minotti et al. | |
| 9,939,246 B2 * | 4/2018 | Louvigne | G01B 5/30 |

OTHER PUBLICATIONS

FR Search Report, dated Jan. 30, 2017, from corresponding FR 1600342 application.

* cited by examiner

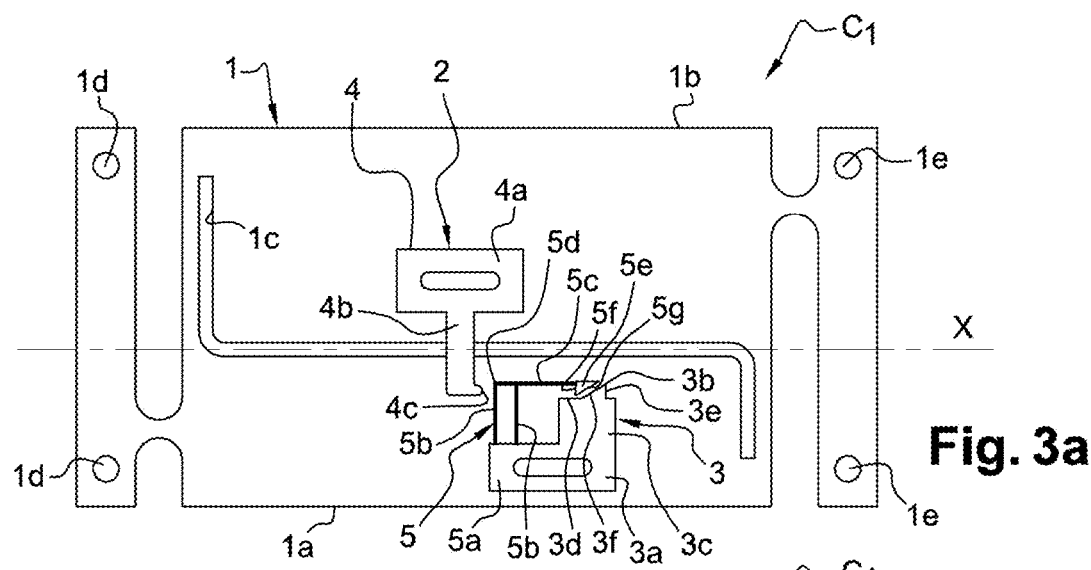
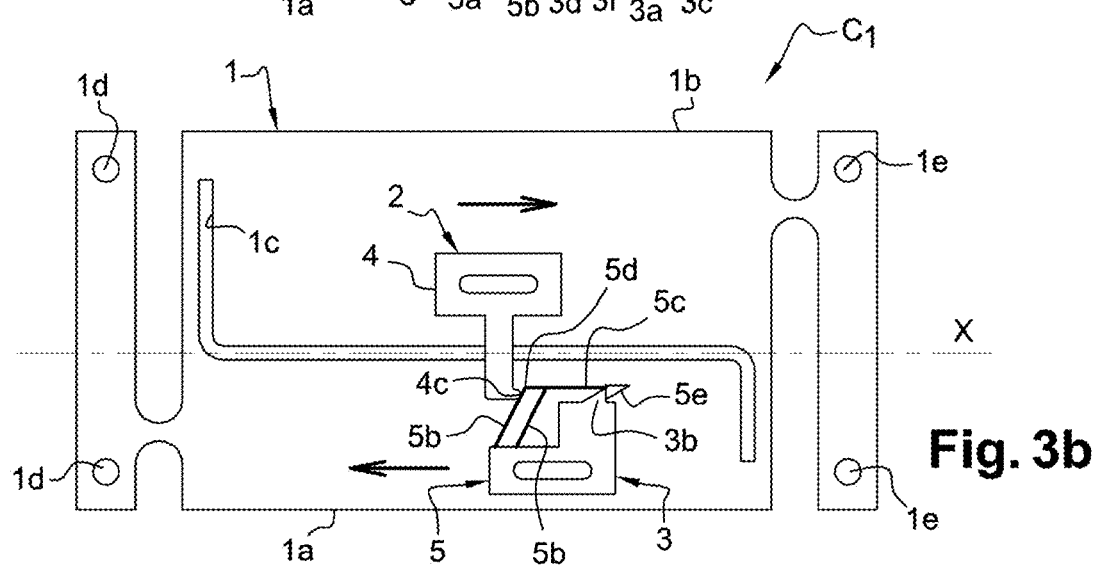
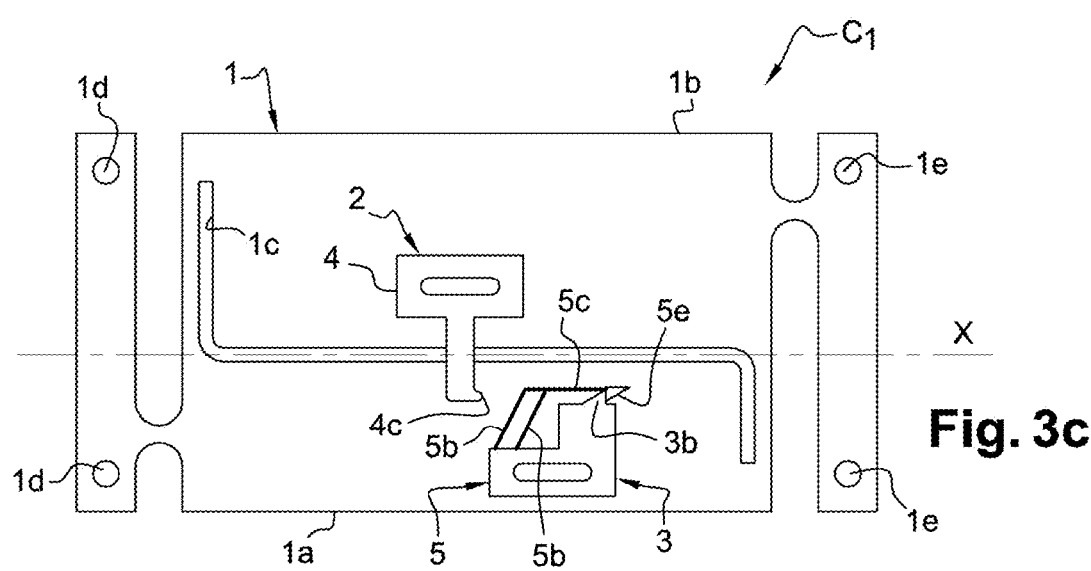

STRAIN SENSOR WITH MEASUREMENT DISCRIMINATION ACCORDING TO THE DEFORMATION DIRECTION

The present invention relates to the field of microsensors, and relates more particularly to a deformation(s) passive sensor enabling a measurement discrimination according to the direction of the deformation.

With the term "passive", it is meant that the sensor operates without any power source, contrary to the so-called active sensors which use a power source such as a power supply or an electric power recovery system.

Patent application EP1998145 A1 discloses a reversible and passive microsensor for counting the number of load cycles applied to a structure subjected to a repeated exterior action, which can for example correspond to the number of cycles of temperature, of tension, compression and/or flexion mechanical loads generated, for example, by the passage of vehicles on a bridge, generating a known stress level in the structure. Indeed, in the field of the road infrastructures such as, for example, a bridge, it is important to know the number of vehicles having crossed it, so as to determine its structural evolution.

If referring to FIGS. 1a and 1b, in which a sensor according to EP1998145 A1 is shown, it can be noted that this sensor comprises a system for counting the load cycles that comprises a carrier 101, which is mainly U-shaped and thereby comprises a first part 102 and a second part 103 connected by a third part 104 constituting the base of the U, and counting means 105 arranged on the carrier 101 and comprising at least one first toothed wheel 106, so-called counting wheel, arranged on said first part 102 of the carrier 101 and, on one hand, a driving beam 107 for driving this counting wheel 106, said driving beam 107 being fixed, at one 108 of its ends 108, 109, to said second part 103 and provided, at its other end 109, with a tooth 110, visible in FIG. 1b and adapted to constitute a ratchet-type gear 111 with the teeth 112 of the counting wheel 106, and, on the other hand, a non-return device 113 for the counting wheel 106, which here is a non-return beam 175 one end of which is integral with the first part 102 of the carrier 101 and the other end of which carries a tooth 139.

The arrow in FIG. 1b indicates the normal direction of rotation of the counting wheel 106. As it can be better seen in FIG. 1b, the teeth 112 of the counting wheel 106, the tooth 110 of the driving beam 107 and the tooth 139 of the non-return beam 175 each comprise, along said direction, a radial surface 114, 119 and 141, respectively, and an angled surface 115, 118 and 140, respectively, the radial surface 119 and 141 of the teeth 110 and 139 facing a radial surface 114 of a tooth 112 of the counting wheel 106. The radial surface 119 of the tooth 110 is directed so as to come to bear against the radial surface 114 of a tooth 112 when the driving beam 107 is moved in said direction, namely when the second part 103 is moved closer to the first part 102 of the carrier 101. The tooth 139 of the non-return beam 175 is directed in the same way as the tooth 110.

Moving the first and second parts 102, 103 of the carrier 101 closer to each other thus causes the toothed wheel 106 to be driven by the tooth 110 of the driving beam 107 while moving both parts 102, 103 away from each other causes the first toothed wheel 106 to be held by the non-return device 113 and causes the tooth 110 of the driving beam 107 to be retracted on a tooth 112 of the first toothed wheel 106. To this end, the driving beam 107 has an elasticity sufficient to enable the tooth 110 to be retracted without any deterioration. In addition, the non-return beam 175 and the driving beam 107 are given a deflection when they are in place against the wheel 106. This initial deformation enables to ensure the contact and thus the meshing despite the defects and uncertainties of manufacturing/assembling.

As it can be seen in FIG. 1a, the first and second parts 102, 103 comprise first and second anchoring regions 124 and 125, respectively, arranged along a first axis and a second axis parallel to each other and constituted by bores in each of which a screw can be inserted for fixing the sensor on the structure to be monitored. The bores 124, 125 have a diameter slightly larger than that of said screws. The lower faces, opposed to those visible in FIG. 1a, of the respective parts 102, 103 and 104 of the carrier 101 are planar and provided in a same plane and intended to be pressed by said screws against the structure to be monitored. In this type of sensor, the axis of the counting wheel 106 is located on said axis of the first anchoring region 124 and the driving beam 107 is integral with the second part 103.

When the carrier 101 is subjected to a cycle of tension load along the orientation X (FIG. 1a), for example because the structure is also subjected to a tension load, the first and second parts 102, 103 of the carrier 101 will first move away from each other when the load appears, which does not cause a rotation of the counting wheel 106 which is held by the non-return device 113, and then the parts 102, 103 will move closer to each other due to the removal of the load, causing the tooth 110 of the driving beam 107 to rotate the counting wheel 106. The same applies when the carrier 101 is subjected to a cycle of compression load along the orientation X, with the difference that the counting wheel 106 is driven when the load appears and no longer when it is removed.

The solution forming the basis of the detection system of the sensor according to EP1998145 A1 thus enables to reliably count the number of load cycles to which structure is subjected along an orientation X of the structure, regardless of the direction of the loads along the orientation X. In other words, the sensor does not discriminate between a tension load on the sensor and a compression load on the sensor, but only counts the number of load cycles.

It is noted here that the anchoring regions 124, 125 are provided such that the length of the carrier 101 in the orientation X is as large as possible, and such that the deformation of the structure between said first and second axes is at least equal to the pitch P of the teeth 112 of the counting wheel 106. Indeed, when the sensor is fixed to a structure subjected to a deformation, the variation in the distance between both anchoring regions 124, 125, thus between the first and second axes, is proportional to this length L. Therefore, for a given pitch P of the teeth 112 of the counting wheel 106, and in the case of using a single driving beam 107, the deformation of the structure between the first and second axes should be at least equal to P and, preferably, smaller than or equal to 1.5 P.

In other words, a load cycle on the structure which causes a variation in the distance between the anchoring regions 124, 125 smaller than said pitch P will not be counted. In addition, any distance variation larger than the threshold value that is the pitch P will be counted as one cycle, regardless of the amplitude of this variation in distance.

The solution forming the basis of the detection system of the sensor according to EP1998145 A1 thus has also the disadvantage of not enabling to detect several amplitude thresholds for the variation in the distance between the first and second anchoring regions.

If referring to FIGS. 2a-2d, a sensor according to the French patent FR2974410 B1 is shown, which relies on the same technical principle as the sensor according to EP1998145 A1, but enables to detect several thresholds.

If referring first to FIG. 2a, it can be seen that the carrier 101 here comprises first and second L-shaped sub-assemblies 202, 203 arranged head to tail and separated mainly longitudinally along the orientation X by a gap 204, and the respective bases 205, 206 of which are, in part, regions for anchoring the carrier 201 on the structure to be monitored. These bases 205, 206 each comprise two bores 207, 208 and 209, 210. The axes Y1 and Y2 passing respectively through the centers of the bores 207, 208 and 209, 210 are perpendicular to the orientation X, while the axes X1 and X2 passing respectively through the centers of the bores 207, 208 and 209, 210 are parallel to the orientation X. Furthermore, the first and second longitudinal parts 211, 212 are connected to each other, at their ends, by an elastic member, namely a material strip 213 and 214.

The second part 211 of the first sub-assembly 202 comprises three first bores (not visible) evenly distributed along the orientation X, as well as three pairs of second bores (not visible), the axis passing through the centers of a pair of second bores being parallel to the axis Y1 and each of the pairs being associated with one of the first bores. Each second bore is intended to receive a pin protruding from the carrier 201 and enable the pre-positioning of non-return means.

The second part 211 of the first sub-assembly 202 also comprises as many recesses 215 with a substantially square shape as first bores, each recess 215 being centered around one of the first bores. It also comprises three protrusions 216, which can be better seen in FIG. 2c, protruding from the lateral surface of the second part 211 of the first sub-assembly 202 facing the second part 212 of the second sub-assembly 203. For each of the first bores, the axis passing through its center and parallel to the axis Y1 is also an axis of symmetry of one of the protrusions 216. Each of these protrusions comprises, in its median part, a third bore.

The second part 212 of the second sub-assembly 203 comprises three pairs of fourth bores (not visible) distributed in the same way as the first bores along the orientation X, each of said pairs being associated with one of the first bores. Each fourth bore is intended to receive a pin protruding from the carrier 201 and enable the pre-positioning of driving means. In addition, the lateral surface of the second part 212 of the second sub-assembly 203 facing the second part 211 of the first sub-assembly 202 comprises notches 217 (FIG. 2c) of larger sizes than those of the protrusions 216 and intended to enable the protrusions 216 to be inserted therein.

Each of the bases 205, 206 is partially separated from the corresponding second part of the L shape by two notches 218, 219 which are coaxial and face each other. The small notches 218 are not essential. The large notches 219 enable to create the elastic members, namely the material strips 213, 214 for making the sub-assemblies 202, 203 integral with each other.

On the carrier 201 are provided three detection systems 220, 221, 222 each comprising: pins 223, 224, 225, 226 press-fitted in said first, second, third and fourth bores, and protruding from the carrier 201 and acting as a stop or a pivot pin; a toothed wheel 227; non-return means 228; and an actuating device 229.

If referring particularly to FIG. 2c, it can be seen that each actuating device 229 comprises a 9-shaped plate comprising:
a first O-shaped part 230, which is rigid and fixed to the second part 212 of the second sub-assembly 203, the middle opening of this first part 230 being constituted by a slotted hole;
a second part 231 which is elastic and one end of which is integral with the first part 230, the other end of which being integral with a third part 232; and
the third part 232, comprising a main L-shaped beam 233, one of the lateral faces of which is fixed to said second part 232 while the base is integral with a secondary beam 234 having substantially the same length and arranged parallel to the main beam 233, but being thinner and comprising, as schematically shown in FIG. 2d, a tooth 235 at its end.

The non-return means 228 also take the form of a plate and comprise:
a first O-shaped part 237, which is rigid and fixed to the second part 211 of the first sub-assembly 202 of the carrier 201, the middle opening of this first part 237 being constituted by a slotted hole; and
a second part 238 of a smaller size than that of the first part 237 and comprising a main L-shaped beam 239, one of the lateral faces of which is fixed to said first part 237 while the base is integral with a secondary beam 240 having substantially the same length and arranged parallel to the main beam 239, but being thinner and comprising, as schematically shown in FIG. 2d, a tooth 241 at its end.

Furthermore, the lateral face of the first part 230, 237 of the actuating device 229 and of the non-return means 228, respectively, a fraction of which is integral with the second part 231 and 238, respectively, comprises a notch 236, 242 having substantially the same size as the pins 226 and 224, respectively, and the shape of this first part 230, 237 as well as the position of the pins 224, 226 on the carrier 201 enable a perfect pre-positioning of the actuating device 229 and the non-return means 228 before they are fixed, for example by bonding or screwing, on the carrier 201.

If referring to FIG. 2d, it can be noted that the counting principle of the sensor according to FR2974410 is effectively identical to that of the sensor according to EP1998145, and thus that the toothed wheel 227 comprises teeth 243 on its outer peripheral surface 244 and an inner peripheral surface 245, which is preferably rough, intended to cooperate with a sleeve 246 integral with the pin 223 so as to generate a resisting torque and prevent a self-rotation of the toothed wheel 227. The secondary, or driving, beam 234 of the actuating device 229 comprises the tooth 235 at its free end, this tooth 235 being able to form a ratchet-type gear with those 243 of said wheel 227.

In FIG. 2d, the orientation OX indicates the orientation of the deformations that the sensor can detect while the arrow indicates the normal direction of rotation of the counting wheel 227. The teeth 243 of the wheel 227, the tooth 235 of the driving beam 234 and the tooth 241 of the secondary beam 240 have the same configuration as that of FIG. 1b, and the teeth 235 and 241 are thus able to form a ratchet-type gear with the teeth 243 of the counting wheel 227.

Here, it can be noted that the function of the pin 225 inserted in the bore of the protrusion 216 is to restrict, in the orientation OX, the stroke of the main beam 233 to a value about equal to 1.5 times the pitch P of the teeth 243 of the associated toothed wheel 227. As the driving beam 234 is integral with the main beam 233 and parallel thereto, its movement along the orientation OX will also be restricted to 1.5 times said pitch P. Therefore, with this pin 225 constituting a restricting or stopping device, any movement along the orientation OX larger than said pitch P will cause the toothed wheel 227 to rotate only of an angle corresponding to a single tooth 243.

In order to enable the detection of several different deformation thresholds, the various toothed wheels 227 have a tooth pitch that is different from one wheel to another. In this way, a deformation Δx to which the structure is subjected will be detected or not according to its value and the value of the pitches P1, P2 and P3 of the three wheels 227:
if Δx<P1, then no detection by the wheels 227,
if P1<Δx<P2, then a count only by the wheel 227 with the pitch P1,
if P2<Δx<P3, then a count by the wheels 227 with the pitches P1 and P2, and
if Δx>P3, then a count by the three wheels 227.

The sensor according to FR2974410 B1 thus solves the problem of detecting different deformation thresholds. However, as for the sensor according to EP1998145 A1, no discrimination between a tension load on the sensor and a compression load on sensor is possible.

An object of the present invention is thus to proved a passive sensor enabling a measurement discrimination according to the type of deformation, namely lengthening (tension load) or shortening (compression load) of the sensor.

The present invention relates to a passive sensor for deformation(s) to which a structure is subjected along a so-called measurement orientation, the sensor comprising a detection system for detecting a variation in a distance between two points or regions of a structure, and a carrier having a first part and a second part configured to be fixed respectively to one of said two points or regions of the structure such that, when one of the first and second parts moves in a direction along the measurement orientation, the other of the first and second parts moves in the opposite direction, the detection system comprising:
 a deformation measuring assembly carried by the first part of the carrier and actuatable only in one direction, so-called measurement direction, of the measurement orientation, in order to measure and store one among the amplitude of the deformation and the number of deformation cycles,
 an actuating device comprising an actuating member which is movable along the measurement orientation and is configured to actuate the deformation measuring assembly when the actuating member is moved in the measurement orientation, as a result of a relative movement between the first and second parts of the carrier,
characterized in that the actuating device comprises:
 an intermediary assembly comprising:
  a fixing part using which the intermediary assembly is carried by one of the first and second parts of the carrier,
  the actuating member, and
  an elastic connection between the fixing part and the actuating member, and
 an actuating assembly which is integral with the one among the first and second parts of the carrier that does not carry the intermediary assembly, and which has a so-called push part which is directed in the measurement direction, the actuating assembly being configured such that:
  in case the intermediary assembly is carried by the first part of the carrier, the push part faces the intermediary assembly so as to apply thereon a push in the measurement direction when the second part of the carrier moves in the measurement direction, thereby moving the actuating member in the measurement direction in order to actuate the deformation measuring assembly, but so as not to exert any action on the intermediary assembly when the second part of the carrier moves in a second direction opposite the measurement direction; and
  in case the intermediary assembly is carried by the second part of the carrier, the push part faces the intermediary assembly so as not to exert any action thereon when the second part of the carrier moves in the measurement direction, the actuating member thus being moved together with the second part of the carrier in the measurement direction in order to actuate the deformation measuring assembly, but so as to apply a push on the intermediary assembly when the second part of the carrier moves in the direction opposite the measurement direction, in order to prevent any relative movement between the actuating member and the deformation measuring assembly,
whereby the deformation measuring assembly will be actuated only when the second part of the carrier moves in the measurement direction, thereby allowing a measurement discrimination between the sensor being subjected to a tension load and the sensor being subjected to a compression load.

In other words, the actuating assembly is configured to cooperate, by the push part, with the intermediary assembly so as to allow the actuating member to move in the measurement direction with respect to the deformation measuring assembly when the second part of the carrier moves in the measurement direction, and thus actuate the deformation measuring assembly, but so as to prevent the actuating member from moving with respect to the deformation measuring assembly when the second part of the carrier moves in a second direction opposite the measurement direction.

With the term "integral", it is meant that the actuating assembly moves as one piece with the part of the carrier to which it is connected.

The movement direction of a part of the carrier is by convention defined in the present application with respect to a fixed frame of reference centered on the center of the passive sensor, in its non-deformed state.

According to a first particular embodiment of the present invention, the intermediary assembly is carried by the first part of the carrier and the actuating assembly is integral with the second part of the carrier, and the deformation measuring assembly comprises at least one fixed tooth and the actuating member comprises at least one so-called movable tooth, the or each fixed tooth providing a retaining face directed in the measurement direction and configured to enable a movement of the one or several movable teeth beyond said fixed tooth as a result of a movement of the second part of the carrier in the measurement direction, but to retain the or one of the movable teeth when the actuating member moves in the second direction under the action of the elastic connection, after having moved beyond said fixed tooth.

The sensor according to the first embodiment allows to determine if the structure to be monitored has been subjected to a load higher than a predefined threshold in the measurement direction, corresponding either to a tension load or a compression load. Such sensor could be applied, for example, to a sensitive piece of a mechanism such as, for example, a landing gear, so as to know, in case of accident, if the piece has been subjected to a non-allowable load.

The actuating member and/or the measuring assembly can thus comprise several teeth, with a constant pitch or a non-constant pitch.

According to a variant of the first particular embodiment, the deformation measuring assembly comprises several fixed teeth, spaced from each other in the measurement direction and in an orientation orthogonal to the measurement direction, preferably located in a same plane, and the actuating member comprises several movable teeth also spaced from each other such that each movable tooth is located on the axis of a corresponding fixed tooth, the movable teeth and/or the fixed teeth being spaced from each other by a pitch smaller than the length of the movable teeth and/or the fixed teeth.

The actuating member may be formed by at least one so-called actuating beam, the at least one actuating beam comprising one or several movable teeth, and the elastic connection may comprise at least two parallel connecting beams each having a first end integral with the fixing part and a second end integral with the at least one actuating beam, the at least two connecting beams forming a deformable parallelogram.

According to a second particular embodiment of the present invention, the deformation measuring assembly is a toothed wheel rotatably mounted on the first part of the carrier and the actuating member is formed by a so-called actuating beam comprising, in an end region, at least one tooth extending between two teeth of the toothed wheel so as to constitute a gear with the teeth of the toothed wheel.

The sensor according to the second embodiment is a reversible sensor enabling to count the number of load cycles (or variations of the distance between said two points or regions of the structure) only in the measurement direction, not in the opposite direction. By the term "reversible", it is meant a sensor capable of detecting a load cycle without being deteriorated, and thus capable of detecting another cycle.

Advantageously, non-return means will be provided and configured to prevent a rotation of the toothed wheel in the rotation direction opposite that corresponding to the measurement direction. Such non-return means could be similar to those according to FR2974410 B1 and EP1998145 A1 (beam with tooth or braking on the rotation pin of the wheel, for example).

The intermediary assembly and the actuating assembly may be carried by the first and second parts of the carrier, respectively, and the actuating assembly may extend in a cantilever manner above the first part of the carrier, the end region of the actuating assembly which is cantilevered having the push part, the push part being in contact with the intermediary assembly or being spaced therefrom.

According to a first variant of the second embodiment, the intermediary assembly and the actuating assembly are carried by the first and second parts of the carrier, respectively, and the intermediary assembly comprises, extending from the end of the elastic connection opposite the fixing part of the intermediary assembly, a pressing part which is cantilevered above the second part of the carrier and against which the push part will apply a push in case the second part of the carrier moves in the measurement direction.

According to a second variant of the second embodiment, the intermediary assembly and the actuating assembly are carried by the second and first parts of the carrier, respectively, and the intermediary assembly comprises, extending from the end of the elastic connection opposite the fixing part of the intermediary assembly, a pressing part which is cantilevered above the first part of the carrier and against which the push part will apply a push in case the second part of the carrier moves in the direction opposite the measurement direction, the push part being preferably positioned so as to hold the actuating beam, against the return action of the elastic connection, in an offset position, in the measurement direction, from the position the actuating beam would occupy in the absence of the push part.

In the first and second variants of the second embodiment, the actuating assembly may advantageously comprise a disk-shaped part the outer edge of which constitutes the push part, the disk-shaped part being mounted so as to be rotatable around a rotation axis which is offset with respect to the center of the disk-shaped part, such that a rotation of the disk-shaped part enables to vary either the distance between the push part and the pressing part of the intermediary assembly or the distance between the offset position, in which the actuating beam is held, and the position it would occupy in the absence of the actuating assembly.

According to a third variant of the second embodiment, the intermediary assembly and the actuating assembly are carried by the first and second parts of the carrier, respectively, and the actuating member is formed by an intermediary piece comprising, on one hand, at least one tooth extending between two teeth of the toothed wheel so as to constitute a gear with the teeth of the toothed wheel and, on the other hand, a recess in which the push part of the actuating assembly extends, the recess having a pressing face opposite the push part, and preferably also spaced from the push part. The intermediary piece could be a L-shaped piece the base of which has a face forming said pressing face, and the longitudinal section of which is connected, at its end, to the elastic connection, which could for example be formed by a tension spring integral with the intermediary piece at a first end and integral with the first part of the carrier at a second end, the axis of the tension spring being parallel to the measurement orientation.

As a variant, for the second embodiment and its variants, the elastic connection of the intermediary assembly may comprise at least two parallel connecting beams, orthogonal to the measurement direction and each having a first end integral with the fixing part and a second end integral with the actuating beam, the at least two connecting beams forming a deformable parallelogram.

According to a third embodiment of the present invention, the sensor comprises a second deformation measuring assembly carried by the first part of the carrier and actuatable only in a second measurement direction, opposite the first measurement direction, in order to measure and store one among the amplitude of a deformation and the number of deformation cycles, and the actuating device comprises:
  a second intermediary assembly comprising:
    a second fixing part using which the second intermediary assembly is carried by one of the first and second parts of the carrier,
    a second actuating member movable along the measurement orientation and configured to actuate the second deformation measuring assembly when the second actuating member is moved in the second measurement direction, and
    a second elastic connection between the second fixing part and the second actuating member, and
  a second actuating assembly integral with the one among the first and second parts of the carrier that does not carry the second intermediary assembly, and having a second push part which is directed in the second measurement direction, the second actuating assembly being configured such that:
    in case the second intermediary assembly is carried by the first part of the carrier, the second push part faces the second intermediary assembly so as to apply thereon a push in the second measurement direction when the second part of the support moves in the second measurement direction, thereby moving the second actuating member in the second measurement direction in order to actuate the second deformation measuring assembly, but so as not to apply any action on the second intermediary assembly when the second part of the carrier moves in the first measurement direction; and in case the second intermediary assembly is carried by the second part of the carrier, the second push part faces the second intermediary assembly so as not to exert any action on the second intermediary assembly when the second part of the carrier moves in the second measurement direction, the second actuating member thus being moved together with the second part of the carrier in the second measurement direction in order to actuate the second deformation measuring assembly, but so as to apply a push on the second intermediary assembly when the second part of the carrier moves in the first measurement direction, in order to prevent any relative movement between the second actuating member and the second deformation measuring assembly, whereby the second deformation measuring assembly will be actuated only when the second part of the carrier moves in the second measurement direction, thereby enabling the sensor to measure a deformation due to a tension load on the sensor or a deformation due to a compression load on the sensor, while discriminating them from each other.

The sensor according to the third embodiment thus allows to make a measurement associated with a stress in a first measurement direction and with a stress in a second opposite measurement direction, while allowing a distinction of the measurements according to the measurement direction. Such sensor is particularly advantageous in the cases where it is not possible to dispose several sensors on a specific area of the structure to be monitored, for example, because it has a small size.

The operating assemblies and the intermediary assemblies of the sensors according to the present invention could, for example, be made of silicon, metal or plastic material.

In order to better illustrate the subject-matter of the present invention, particular embodiments thereof will be described below, for indicative and non-limiting purposes, with reference to the appended drawings.

In the drawings:

FIG. 1b is a schematic view of the counting toothed wheel, the actuating beam and the non-return beam of the sensor of FIG. 1a;

FIG. 2c is an enlarged view of one of the detection and counting systems of the sensor of FIG. 2a;

FIGS. 3a, 3b, 3c and 3d are top schematic views of a sensor according to a first embodiment of the present invention, for detecting a threshold of amplitude for tension deformation, respectively in the initial state, at said amplitude threshold, after having returned to the initial state, and in the event of a compression load;

Figure 1A:
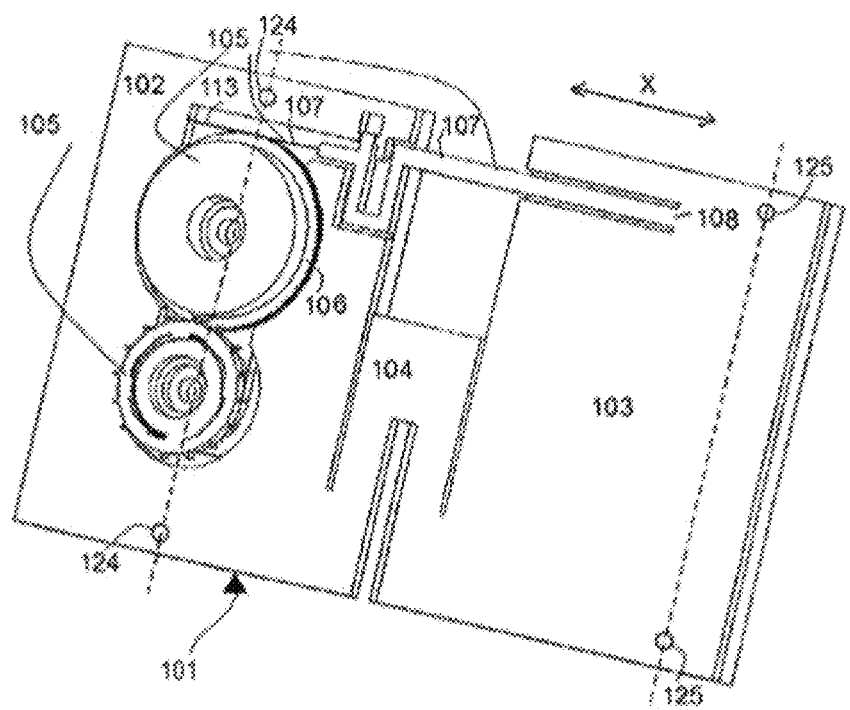
FIG. 1a, is a perspective view of a reversible and passive sensor for counting the number of load cycles to which a structure is subjected, according to a first prior art.
Figure 1B:
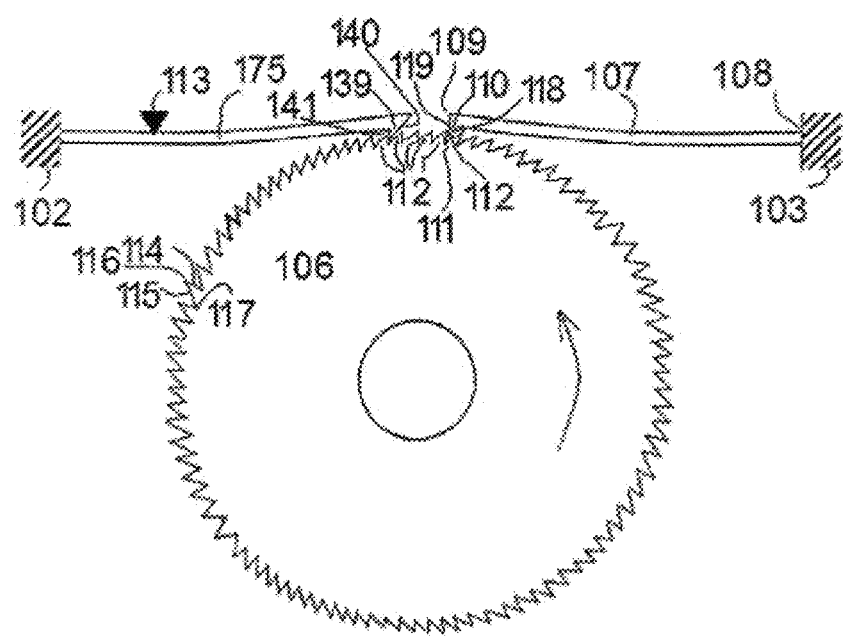

The sensors according to the first, second and third embodiments described below, as well as their variants, all comprise a carrier similar to the carrier 201 of the French patent FR2974410 B1 described above, namely a carrier 1 having a first part 1a and a second part 1b corresponding to the first and second sub-assemblies 202, 203 of the carrier 201, respectively, spaced by a gap 1c, and having two anchoring regions 1d, 1e each constituted by two pairs of bores 1d, 1e.

In the Figures, the measurement orientation is parallel to the longitudinal orientation of the carrier 1. When the sensor is subjected to a tension load, the carrier 1 extends, and thus the anchoring regions 1d, 1e move away from each other, the first part 1a moves to the left while the second part 1b moves to the right when observing the Figures, and the measurement direction is directed to the right. However, when the sensor is subjected to a compression load, the carrier 1 shortens, and thus the anchoring regions 1d, 1e move closer to each other, the first part 1a moves to the right while the second part 1b moves to the left, and the measurement direction is directed to the left.

Here, it is noted that the first and second parts 1a, 1b are rigid and do not become deformed or very little. A movement of the first and second parts 1a, 1b can thus be observed in the measurement orientation.

It is also noted that the views are schematic and that the detection systems have been enlarged in an exaggerated manner so as to allow a better view of their behaviors in the event of loads. The movement of the first and second parts 1a, 1b of the carrier 1 is not shown in the Figures. Of course, the deformations intended to be measured by the sensors according to the present invention are of the order of a few hundreds of nanometers to several tens of micrometers. Embodiments at another scale could be used to detect, count and store deformations in the range from several millimeters to several centimeters.

First Embodiment: Detecting a Threshold of Amplitude for a Tension Deformation If referring first to FIG. 3a, in which a top schematic view of a sensor $C_1$ according to a first embodiment of the present invention is shown, for detecting a threshold of amplitude for a tension deformation, it can be seen that the sensor $C_1$ comprises an actuating device 2 and a measuring assembly 3.

The actuating device 2 comprises an actuating assembly 4 and an intermediary assembly 5.

The actuating assembly 4 is formed by a rigid plate comprising a first O-shaped part 4a, fixed to the longitudinal section of the second part 1b of the carrier 1, and a beam 4b extending from the lateral edge of the first part 4a which is closest to the gap 1c, and perpendicular to said edge, and thus perpendicular to the orientation X. The length of the beam 4b is such that the free end region of the beam 4b is cantilevered with respect to the longitudinal section of the second part 1b, in other words it is located above the longitudinal section of the first part 1a. The free end region of the beam 4a has, on a longitudinal edge of the beam 4b, a rounded protrusion forming a push part 4c. The actuating assembly 4 is integral with the second part 1b and thus moves as one piece with the latter.

The intermediary assembly 5 comprises a fixing part 5a, two connecting beams 5b and an actuating beam 5c. The fixing part 5a is a rigid O-shaped plate fixed to the longitudinal section of the first part 1a of the carrier 1. The two connecting beams 5b both extend perpendicular to an edge of the fixing part 5a which is parallel to the orientation X. Therefore, they are parallel to each other and perpendicular to the orientation X. The free ends of the connecting beams 5b are integral with the actuating beam 5c, at a region of a first end 5d of the actuating beam 5c, the latter carrying, at its end, a tooth 5e, so-called movable tooth. The actuating beam 5c is generally parallel to the orientation X.

Both connecting beams 5b form together a deformable parallelogram. In other words, the actuating beam 5c is connected to the fixing part 5a by a connection allowing to elastically move the actuating beam 5c along the orientation X, while maintaining the actuating beam 5c generally parallel to the orientation X.

The measuring assembly 3 comprises a fixing part 3a and a tooth 3b, so-called fixed tooth. In the example shown in FIGS. 3a-3d, a same rigid O-shaped plate forms the fixing part 5a of the intermediary assembly 5 and the fixing part 3a of the measuring assembly 3. However, the fixing part 3a further comprises a rectangular section 3c extending perpendicular to the edge of the fixing part 5a from which the connecting beams 5b extend, and the tooth 3b is integral with the free edge 3d of the section 3c which is closest to the gap 1c.

A recess will be provided in the longitudinal section of the first part 1a of the carrier 1, which recess could extend below the connecting beams 5b, partially below said section 3c and below the fixed tooth 3b, such that the plate forming the fixing part 5a and the fixing part 3a is fixed to the carrier 1 also partially at the section 3c.

It can here be noted that the middle openings of the first parts 4a and 3a/5a are constituted by a slotted hole, and that the first parts 4a and 3a/5a are fixed to the carrier 1 by any suitable means, such as by bonding or screwing. Pre-positioning by slots and pins could be provided, as for the sensor according to FR2974410 B1. It will be applicable for all embodiments described below.

Each of the fixed tooth 3b and the movable tooth 5e has a first retaining surface 3e, 5f, respectively, which is perpendicular to the orientation X or angled with respect to the orientation X so as to form a stopping notch, and a second angled surface 3f, 5g, respectively, connecting the top of the tooth 3b, 5e to the edge of the section 3c or the free end of the actuating beam 5c, respectively.

The actuating assembly 4 and the intermediary assembly 5 are positioned on the carrier 1 such that the push part 4c is, in the initial state of the sensor, namely in the absence of load, in contact with the first end 5d of the actuating beam 5c or spaced therefrom, and is located between the actuating beam 5c and the anchoring region 1d of the first part 1a of the carrier 1.

The actuating assembly 4 and the intermediary assembly 5 are also positioned such that the movable tooth 5e is able to hold onto the fixed tooth 3b in case the sensor $C_1$ is subjected to a tension load exceeding an amplitude threshold, as will be explained below. To this end, the actuating beam 5c could be given a deflection when implemented, so as to ensure the contact and thus the holding despite the uncertainties of manufacturing/assembling.

If referring now to FIG. 3b, it can be seen, in the event of a tension load on the sensor $C_1$, which results in a movement of the anchoring regions 1d and 1e away from each other, that the push part 4c, which moves as one piece with the second part 1b of the carrier 1, pushes the end 5d of the actuating beam 5c, deforming the deformable parallelogram constituted by the connecting beams 5b, and thus moves the actuating beam 5c towards the fixed tooth 3b.

If the amplitude of the deformation of the sensor $C_1$ is higher than a detection threshold, which will be defined below, the movable tooth 5e will move past the fixed tooth 5b by deforming the actuating beam 5c due to the cooperation of the angled surfaces 3f, 5g, and then will be positioned again against the edge 3d of the fixing part 3a due to the initial deflection of the actuating beam 5c.

When the tension load is removed, the anchoring regions 1d, 1e move closer to each other and the first and second parts 1a, 1b of the carrier 1 thus move in the opposite direction, as shown in FIG. 3c. The action of the push part 4c on the actuating beam 5c will thus be released, such that the latter would be free to return to its initial position (FIG. 3a) under the action of the elastic return provided by the connecting beams 5b. However, such return of the actuating beam 5c to the initial state is prevented by the fixed tooth 3b retaining the movable tooth 5e, thanks to the cooperation between the first retaining surfaces 3e, 5f.

It is thus possible to know whether the tension amplitude threshold has been reached, simply by inspecting the sensor $C_1$ to determine if the actuating beam 5c is retained in deformed position by the fixed tooth 3b.

Figure 3D:
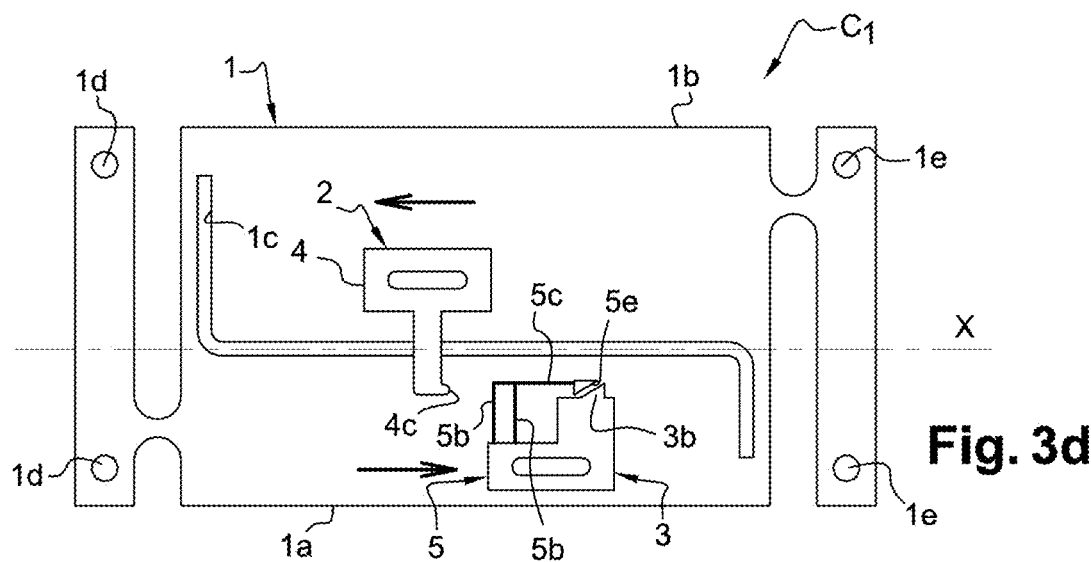

As indicated above, the sensor $C_1$ is a sensor for detecting a threshold of amplitude for a tension load. FIG. 3d shows the sensor $C_1$ when it is subjected to a compression load, which results in a movement of the anchoring regions 1d and 1e towards each other. In this case, it can be noted that the push part 4c and the actuating beam 5c are spaced from each other, and thus that the latter is not moved towards the fixed tooth 3b. After the compression load is removed, the first and second parts 1a, 1b of the carrier 1 return to the initial position of FIG. 3a. No measurement of the compression load is made by the sensor.

The sensor $C_1$ according to the first embodiment thus enables a discrimination to be made between a tension load on the sensor and a compression load on the sensor $C_1$, by enabling only a detection of the tension loads.

Figure 4:
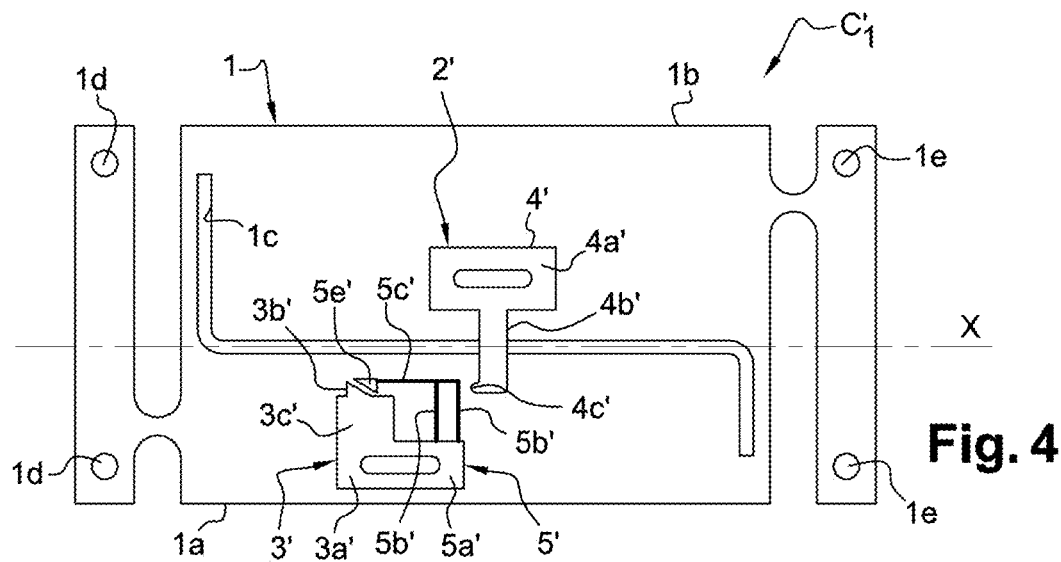
FIG. 4 is a view similar to FIG. 3a, showing a sensor according to the first embodiment, for detection in case of compression.

If referring to FIG. 4, a sensor $C_1'$ according to a variant of the first embodiment is shown, arranged to detect a threshold of amplitude for a compression deformation.

The sensor $C_1'$ comprises an actuating device 2' and a measuring assembly 3' which are symmetrical to the actuating device 2 and the measuring assembly 3 with respect to a median plane perpendicular to the orientation X and the carrier 1.

The actuating device 2' thus comprises, on one hand, an actuating assembly 4', comprising an O-shaped fixing part 4a', a beam 4b' and a push part 4c' and, on the other hand, an intermediary assembly 5' comprising a fixing part 5a', two connecting beams 5b' forming a deformable parallelogram, and an actuating beam 5c' carrying a movable tooth 5e'. The measuring assembly 3' comprises a fixing part 3a', a fixed tooth 3b' and a section 3c'.

The actuating assembly 4' is, this time, located between the actuating beam 5c' and the anchoring region 1e, and the direction of the fixed tooth 3b' and the movable tooth 5e' is reversed with respect to that of the teeth 3b and 5e.

It is easy to understand that the sensor $C_1'$ has the same behavior in case of compression load as the sensor $C_1$ in case of tension load: the push part 4c' pushes the actuating beam 5c' and, if the amplitude of the compression deformation is higher than the amplitude threshold, the actuating beam 5c' will be held in deformed position by the fixed tooth 3b" retaining the movable tooth 5e'. Similarly, no detection will be made by the sensor $C_1'$ in case of a tension load.

In other words, the principle of the configuration of the actuating device 2, 2' and the measuring assembly 3, 3' is applicable both to the sensors intended to detect only the tension loads and the sensors intended to detect only the compression loads.

In addition, as indicated above, this configuration enables to determine if the sensor $C_1$, $C_1'$ has been subjected to a tension or compression deformation higher than or equal to an amplitude threshold.

This amplitude threshold is defined by the distance to be traveled by the push part 4c to cause a movement of the movable tooth 5e beyond the position of the fixed tooth 3b, thereby allowing the movable tooth 5e to be locked by the fixed tooth 3b, from the initial state in the absence of load, said distance being measured along the orientation X.

In the case where, in the initial state, the push part 4c, 4c' is in contact with the actuating beam 5c, 5c', the amplitude threshold is the distance between the tops of the fixed tooth 3b, 3b' and the movable tooth 5e, 5e'. In the case where, in the initial state, the push part 4c, 4c' is at a distance, so-called offset distance, from the actuating beam 5c, 5c', the amplitude threshold is the sum of the offset distance and the distance between the tops of the fixed tooth 3b, 3b' and the movable tooth 5e, 5e'. In both cases, the deformation, whose amplitude is measured, is the one to which the sensor is subjected from the initial state, in other words without any load and without any deformation of the carrier 1, 1'.

It can be noted, using the same components forming the actuating device 2, 2' and the measuring assembly 3, 3', that the value of the amplitude threshold can be set simply by positioning the actuating assembly 4, 4' more or less distant from the actuating beam 5c, 5c'.

First Variant of the First Embodiment

Figure 5A:
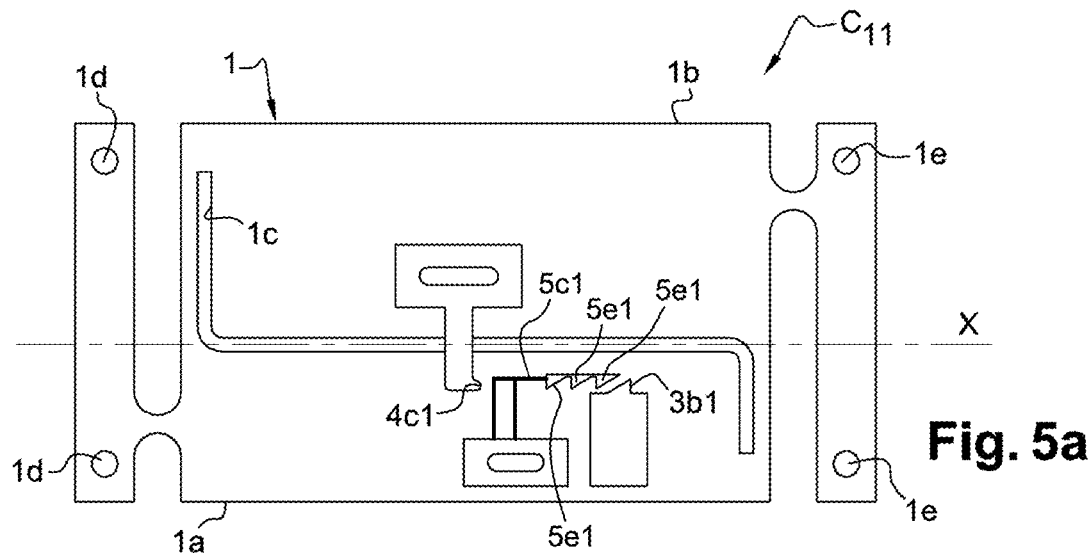
FIGS. 5a and 5b are views similar to FIGS. 3a and 3b, showing a sensor according to a first variant of the first embodiment, having three detection thresholds, respectively in the initial state and at a detection threshold.
Figure 5B:
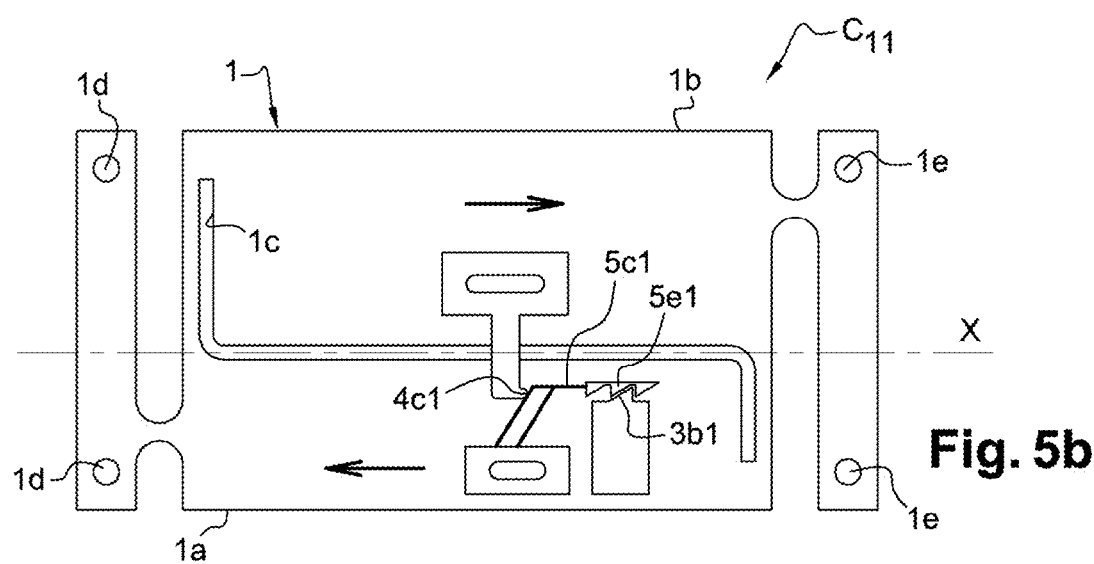

If referring now to FIGS. 5a and 5b, it can be seen that a sensor $C_{11}$ according to a first variant of the sensor $C_1$ is shown, which differs from the latter simply in that the actuating beam 5c1 of the actuating assembly carries three movable teeth 5e1, instead of one tooth. The movable teeth 5e1 are disposed successively so as to form a three-teeth rack, having the same direction as the movable tooth 5e. According to this first variant, only one fixed tooth 3b1 is provided, with the same direction as the fixed tooth 3b.

Such configuration enables to define three detection thresholds of amplitude, that the sensor can detect, for tension deformation. In the case where the push part 4c1 is in contact with the actuating beam 5c1 in the initial state, the first, second and third amplitude thresholds are equal to the distance between the top of the fixed tooth 3b1 and the top, respectively, of the movable tooth 5e1 respectively closest to the fixed tooth 3b1, the middle movable tooth 5e1, and the movable tooth 5e1 farthest from the fixed tooth 3b1.

FIG. 5b shows the sensor $C_{11}$ subjected to a tension load, in particular when the deformation amplitude is equal to the second amplitude threshold, as the middle movable tooth 5e1 is retained by the fixed tooth 3b1.

Second Variant of the First Embodiment

Figure 6A:
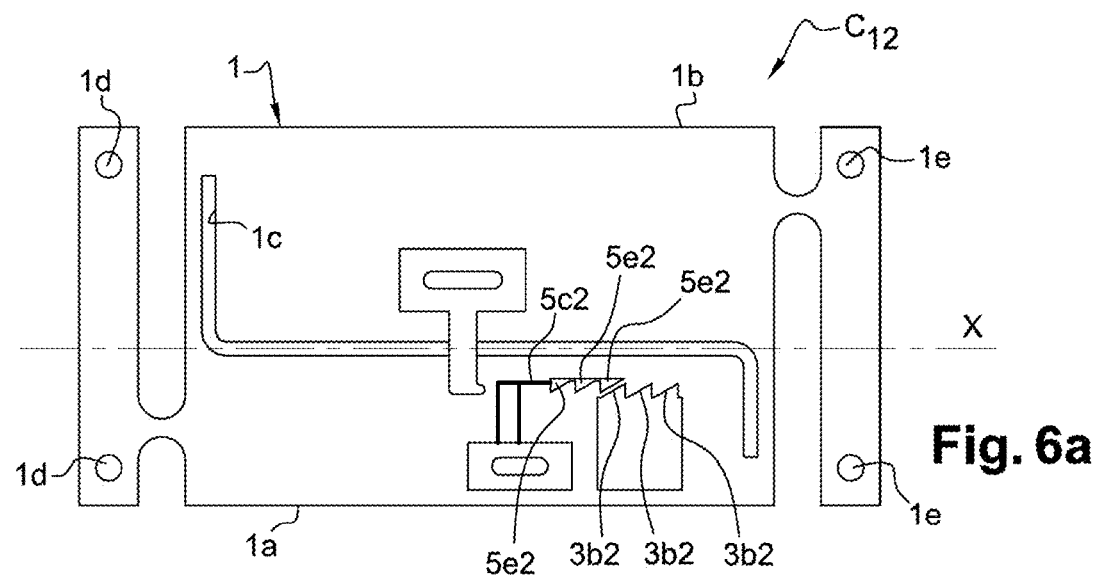
FIGS. 6a and 6b are views similar to FIGS. 5a and 5b, showing a sensor according to a second variant.
Figure 6B:
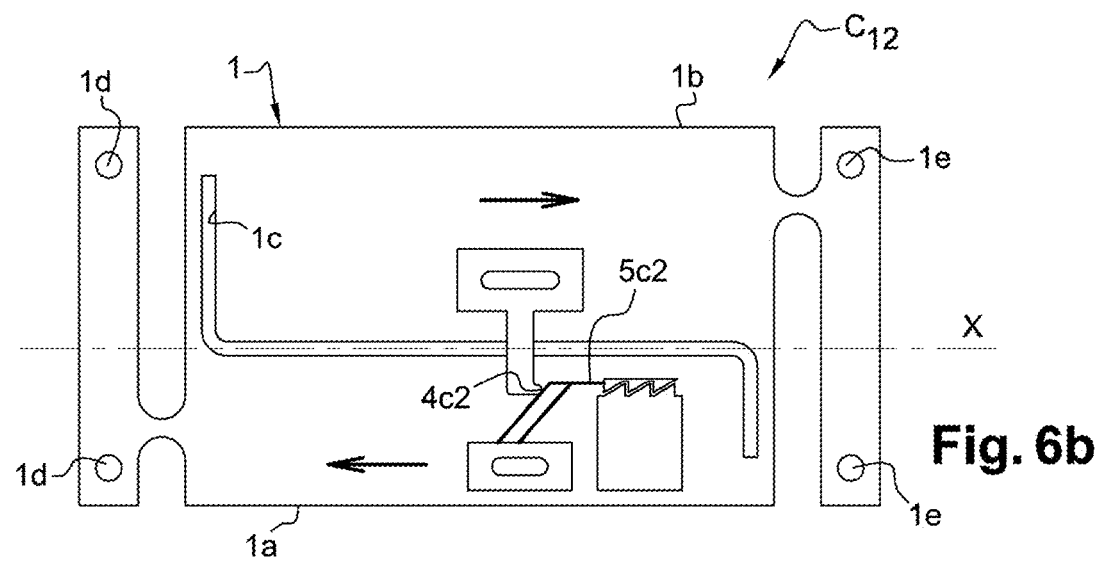

If referring now to FIGS. 6a and 6b, it can be seen that a sensor $C_{12}$ according to a second variant of the sensor $C_1$ is shown, which differs from the sensor $C_{11}$ according to the first variant simply in that there are three fixed teeth 3b2, instead of one tooth, which are disposed successively so as to form a three-teeth rack, having the same direction as the fixed tooth 3b. The actuating beam 5c2 is identical to the actuating beam 5c1 and thus carries three movable teeth 5e2.

The sensor $C_{12}$ also allows to define three detection thresholds of amplitude.

Third Variant of the First Embodiment

Figure 7A:
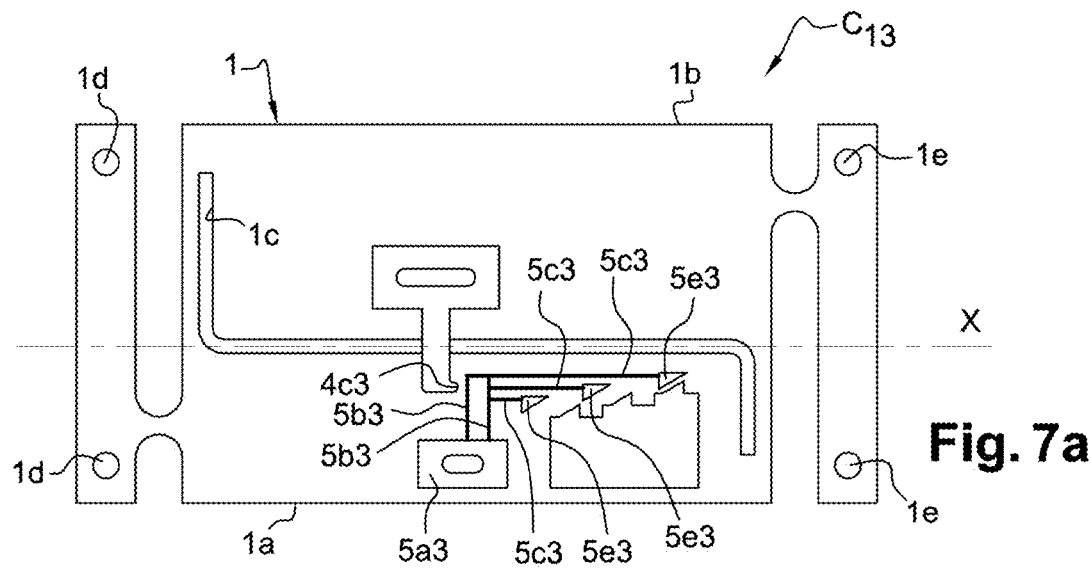
FIGS. 7a and 7b are views similar to FIGS. 5a and 5b, showing a sensor according to a third variant enabling to discretize the counting of several amplitudes with differences in value that are smaller than the pitch of a toothing.
Figure 7B:
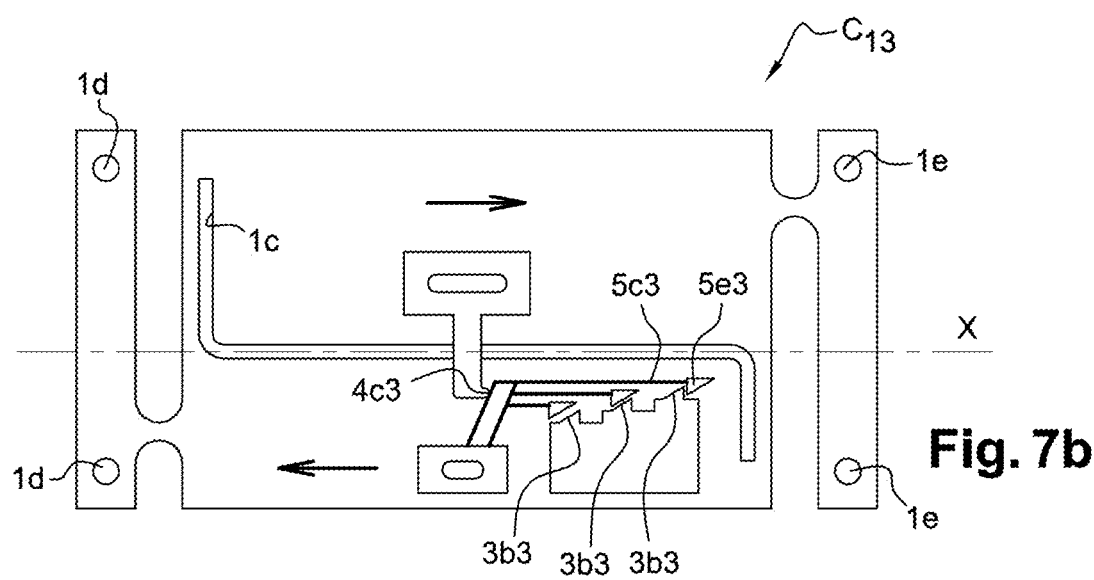

If referring finally to FIGS. 7a and 7b, it can be seen that a sensor $C_{13}$ according to a third variant of the sensor $C_1$ is shown, which differs from the latter in that both connecting beams 5b3 are integral with three actuating beams 5c3 each carrying a movable tooth 5e3, and in that there are three fixed teeth 3b3.

The actuating beams 5c3 are parallel to each other and to the orientation X and are spaced from each other along a transverse orientation which is perpendicular to the orientation X and belongs to the average plane of the carrier 1. The length of the actuating beams 5c3 is increasing, the shortest beam being the closest to the fixing part 5a3. As the movable teeth 5e3 are located at the free end of the actuating beams 5c3, they are also spaced from each other along the orientation X and said transverse orientation. Moreover, the distance between the movable tooth 5e3 of the shortest beam 5c3 and the movable tooth 5e3 of the middle beam 5c3 is smaller than the distance between the movable tooth 5e3 of the middle beam 5c3 and the movable tooth 5e3 of the longest beam 5c3.

The three fixed teeth 5b3 are spaced from each other by a constant pitch along the orientation X, and also along said transverse orientation such that each movable tooth 5e3 corresponds to one fixed tooth 5b3. Particularly, the fixed tooth 5b3 closest to the fixing part 5a3 is located on the same axis as the movable tooth 5e3 of the shortest beam 5c3, the middle fixed tooth 5b3 is located on the same axis as the movable tooth 5e3 of the middle beam 5c3, and the fixed tooth 5b3 is located on the same axis as the remaining movable tooth 5e3.

The direction of the fixed teeth $5b3$ and the movable teeth $5e3$ is identical to the direction of the fixed tooth $5b$ and the movable tooth $5e$, respectively.

The configuration above enables to provide a sensor having three amplitude thresholds separated by a value smaller than the size of the movable and/or fixed teeth. Indeed, it can be understood that in the first and second variants above the three amplitude thresholds are at least separated by the pitch, which is constant, of the rack formed by the fixed teeth and/or the movable teeth. However, in the third variant, the distance between two adjacent movable teeth $5e3$ or two adjacent fixed teeth $5b3$, measured along the orientation X, could be set to be lower than the length of the tooth $5e3$ or $5b3$.

Another way to achieve this result is to define the lengths of the actuating beams $5c3$ such that the difference between the distance between a pair of movable tooth $5e3$/fixed tooth $5b3$ and the distance between the next pair of movable tooth $5e3$/fixed tooth $5b3$ is smaller than the length of the teeth, which is made possible by means of the offset of the teeth $5b3$, $5e3$ along said transverse orientation.

More precise information related to the deformations to which the sensor $C_{13}$ is subjected can thus be achieved, particularly in order to know whether it has been subjected to a deformation very close to an amplitude threshold corresponding to an unacceptable deformation amplitude. For example, such amplitude would correspond to the movable tooth $5e3$ of the shortest beam $5c3$ being retained on the corresponding fixed tooth $5b3$. If referring to FIG. 7b, the sensor $C_{13}$ is shown at a tension deformation amplitude almost equal to, but smaller than this unacceptable amplitude, the push part $4c3$ having moved the beams $5c3$ until the movable tooth $5e3$ of the longest beam $5c3$ is retained by the corresponding fixed tooth $5b3$.

Obviously, the configuration of the first to third variants can be applied to a sensor for measuring a compression load, in the same way as that described in reference to FIG. 4.

It should also be noted that the measuring assemblies and the intermediary assemblies of the sensors according to the first to third variants are formed by individual plates, but they could also be formed by a same plate as in the first embodiment. Also, the measuring assembly 3 and the intermediary assembly 5 of the first embodiment could be formed by two individual plates.

Second Embodiment: Counting the Cycles of Deformations

Figure 8A:
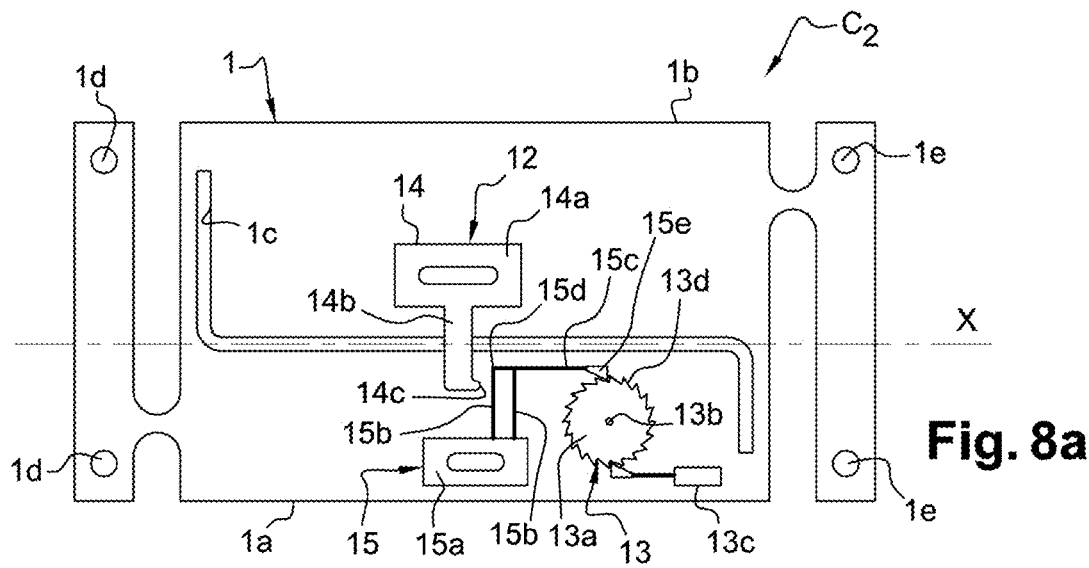
FIGS. 8a, 8b and 8c are top schematic views of a sensor according to a second embodiment of the present invention, for counting the cycles of tension loads, respectively in the initial state, in the middle of a cycle of tension load, and in the event of a compression load.

If referring first to FIG. 8a, it can be seen that a sensor $C_2$ according to a second embodiment of the present invention, for counting the cycles of tension loads, comprises an actuating device 12 and a measuring assembly 13.

The actuating device 12 comprises an actuating assembly 14 and an intermediary assembly 15.

The actuating assembly 14 is identical to the actuating assembly 4 of the first embodiment, and thus comprises a fixing part $14a$, a beam $14b$ and a push part $14c$.

The intermediary assembly 15 is similar to the intermediary assembly 5, and thus comprises a fixing part $15a$, with which it is fixed to the first part $1a$ of the carrier 1, two connecting beams $15b$ forming a deformable parallelogram, and an actuating beam $15c$ having a first end $15d$ which the push part $14c$ is intended to push, and carrying a movable tooth $15e$ at its free end. The push part $14c$ is located between the actuating beam $15c$ and the anchoring region $1d$.

The measuring assembly 12 comprises a toothed wheel $13a$ rotatably mounted around a pin $13b$ fixed perpendicular to the first part $1a$ of the carrier 1, and a non-return device $13c$.

The counting principle of the measuring assembly 13 is identical to that of patent application EP1998145 A1 and patent FR2974410 B1, and which has been described in detail in reference to FIGS. $1a$-$2d$.

If referring to FIG. $8b$, it can be seen, in the event of a tension load on the sensor $C_2$, that the first and second parts $1a$, $1b$ of the carrier 1 are moved to the left and to the right, respectively, and the push part $14c$ will move the actuating beam $15c$ towards the anchoring region $1e$, in a similar way as the sensor $C_1$ of the first embodiment. The movable tooth $15e$ then pushes a tooth $13d$ of the toothed wheel $13a$ and thus rotates the latter in the direction indicated by the arrow, at an angle amounting to a cycle of tension load.

When the carrier 1 returns to the initial state after the tension load is removed, the push part $14c$ releases its pushing on the actuating beam $15c$, until it is not pushing anymore on the latter, which then returns to its initial position represented in FIG. $8a$ without rotating the toothed wheel $13a$ which is retained by the non-return device $13c$.

It can be noted that the non-return device $13c$ is shown in a schematic manner, and that it is equivalent to those of patent application EP1998145 A1 and patent FR2974410 B1, in that it comprises a fixing part and a beam at the end of which is arranged a tooth directed to prevent the toothed wheel $13a$ from rotating in the direction opposite that indicated by the arrow of FIG. $8b$.

If referring now to FIG. $8c$, it can be seen, in the case where the carrier 1 is subjected to a compression load, that the push part $14c$ is moved away from the actuating beam $15c$ and thus does not push it. The intermediary assembly 15 and the measuring assembly 13 both being integral with the first part $1a$ of the carrier 1, the movable tooth $15e$ remains stationary with respect to the toothed wheel $13a$ and thus does not rotate it. When the compression load is removed, the carrier 1 returns to the initial position of FIG. $8a$, where the actuating beam $15c$ is still not moved by the push part $14c$. Therefore, the toothed wheel $13a$ is not rotated during a cycle of compression load.

Thus, it can be noted that the configuration of the actuating device 12 and the measuring assembly 13 according to the second embodiment allows to count only the cycles of tension load, and not the cycles of compression load. In addition, these tension cycles are counted only from a certain level of deformation corresponding to the initial distance between the push part $14c$ and the end of the actuating beam $15c$, and this distance could be nil.

Figure 9:
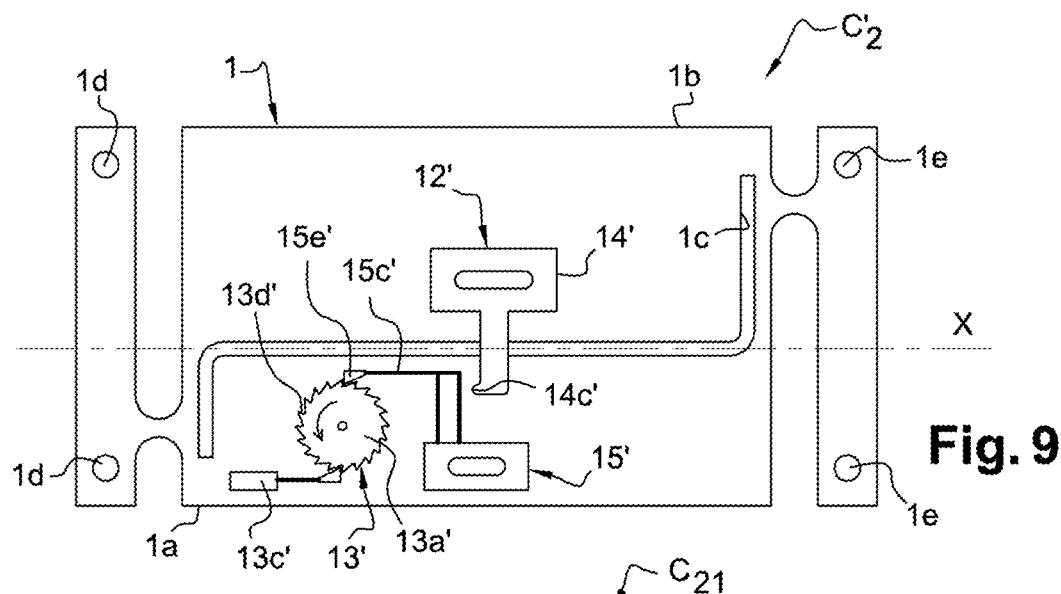
FIG. 9 is a view similar to FIG. 8a, showing a sensor according to the second embodiment, for counting cycles of compression loads.

If referring to FIG. 9, it can be seen that a sensor $C_2'$ according to the second embodiment is shown and arranged to measure cycles of compression load.

The sensor $C_2'$ comprises an actuating device $12'$ and a measuring assembly $13'$ which are symmetrical to the actuating device 12 and the measuring assembly 13 with respect to a median plane perpendicular to the orientation X and the carrier 1. The actuating device $12'$ thus comprises an actuating assembly $14'$ and an intermediary assembly $15'$. The push part $14c'$ is located between the actuating beam $15c'$ and the anchoring region $1e$. The teeth $13d'$ of the toothed wheel $13a'$ of the measuring assembly $13'$ and the movable tooth $15e'$ carried by the actuating beam $15c'$ are directed in the orientation opposite that of the sensor $C_2$.

It is easy to understand that the sensor $C_2'$ has the same behavior in the event of compression load as the sensor $C_2$ in the event of tension load: the push part $14c'$ pushes the actuating beam 15c' which rotates, via the movable tooth 15e', the toothed wheel 13a' according to the direction indicated by the arrow. The toothed wheel 13a' is retained by the non-return device 13c' when the carrier 1 returns to the initial state. Also, in the event of tension load, the push part 14c' will be moved away from the actuating beam 15c' and the toothed wheel 13a' will not be rotated. Thus, only the cycles of compression load will be counted.

In other words, the principle of the configuration of the actuating device 12, 12' and the measuring assembly 13, 13' is applicable both to the sensors intended to count only the cycles of tension loads and the sensors intended to count only the cycles of compression loads.

As for the first embodiment, the push part 14c, 14c' can, in the initial state of the carrier 1, without any load, be in contact with the intermediary assembly 15, 15' or spaced therefrom.

In the case where, in the initial state, the push part 14c, 14c' is in contact with the intermediary assembly 15, 15', the measuring assembly 13, 13' will count the number of cycles of tension or compression loads, as soon as the deformation due to the load has an amplitude larger than the pitch of the teeth of the toothed wheel 13a, 13a'.

Figure 8B:
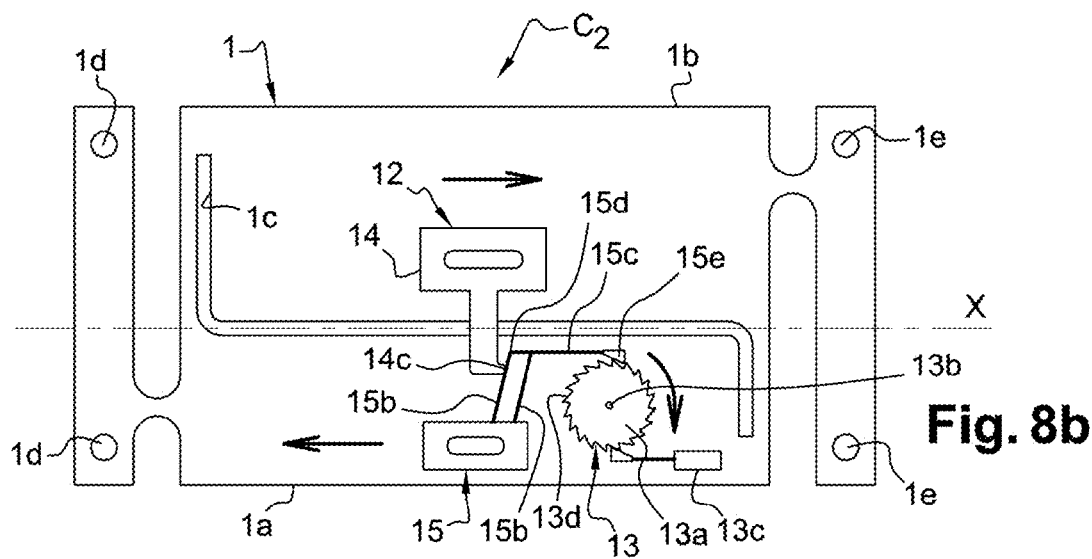
Figure 8C:
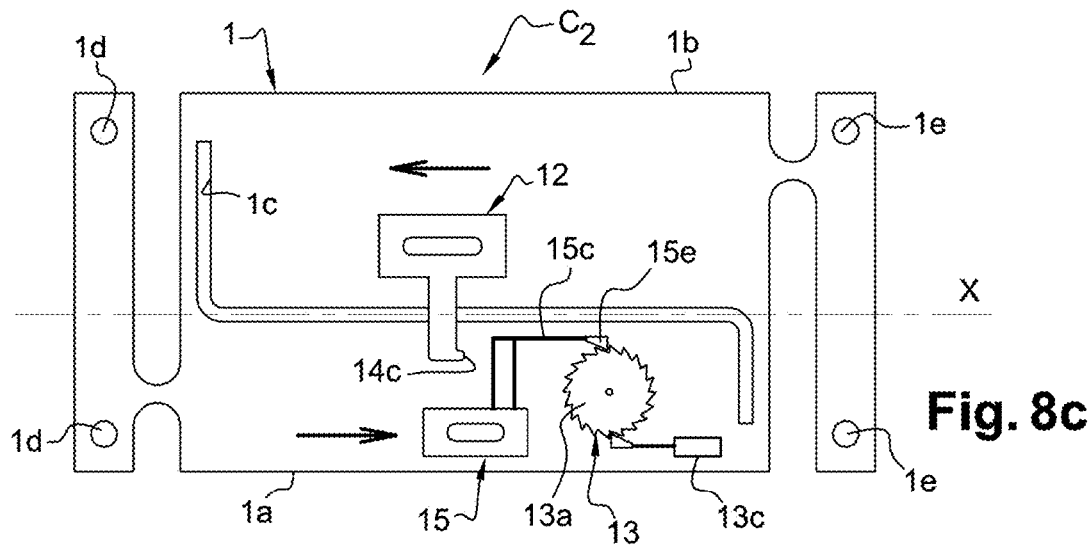

In the case where, in the initial state, the push part 14c, 14c' is at a distance, so-called offset distance, along the orientation X, from the intermediary assembly 15, 15', then a cycle of tension or compression load will be counted by the toothed wheel 13a, 13a' only in the event the deformation due to the load has an amplitude larger than the sum of said offset distance and the pitch of the teeth of the toothed wheel 13a, 13a'. In other words, said offset distance corresponds to offsetting said level of cycle counting threshold, by an amplitude equal to said offset distance (in the case where the push part 14c, 14c' is exactly on the same axis as the actuating beam 15c, 15c') or proportional to said offset distance (in the case where the push part 14c, 14c' faces a connecting beam, as represented in FIGS. 8a-9).

Providing a push part 14c, 14c' at an offset distance from the intermediary assembly 15, 15' thus enables to count only the cycles of tension or compression loads which are higher than a threshold level defined by said offset distance.

First Variant of the Second Embodiment

Figure 10A:
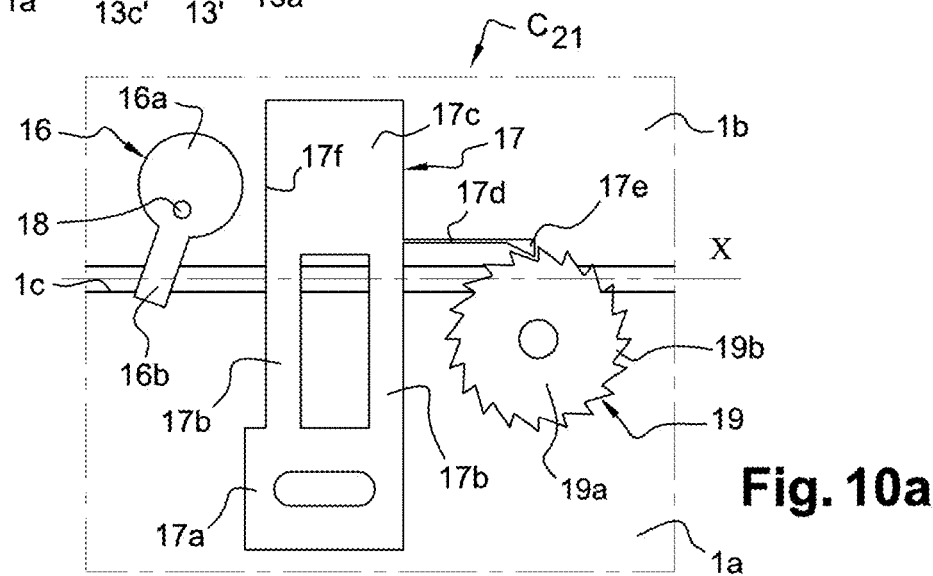
FIGS. 10a and 10b are detailed views similar to FIGS. 8a and 8b, showing a part of a sensor according to a first variant of the second embodiment, still for counting cycles of tension loads.
Figure 10B:
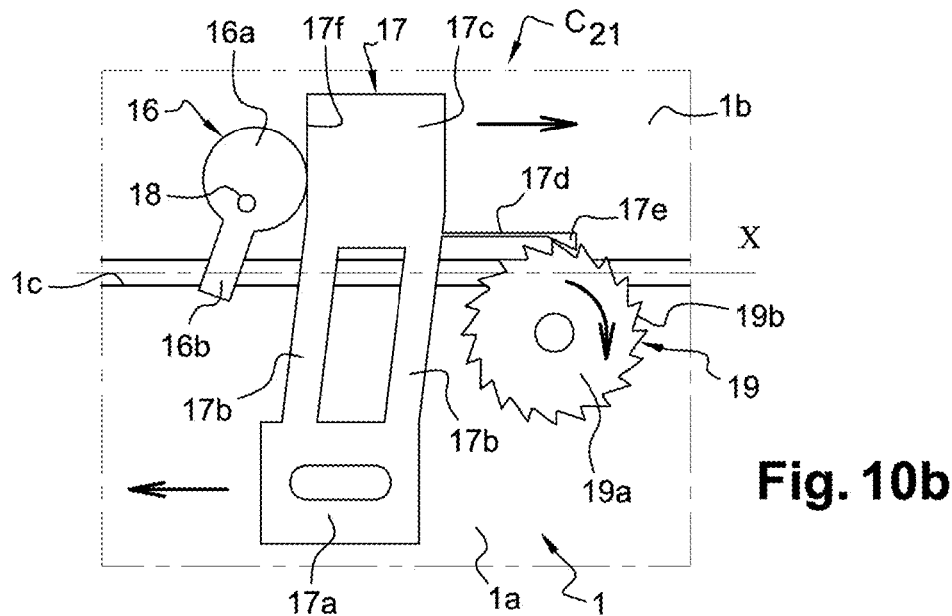

If referring now to FIGS. 10a and 10b, a sensor $C_{21}$ according to a first variant of the second embodiment is shown, which differs from the sensor $C_2$ by the shape of the actuating assembly and the intermediary assembly.

The actuating assembly is here formed by an eccentric piece 16 comprising a disk-shaped part 16a from which a tab 16b extends. The eccentric piece 16 has a through hole offset with respect to the center of the disk-shaped part 16a, hole through which the eccentric piece 16 is mounted on a pin 18 integral with the second part 1b of the carrier 1.

The intermediary assembly 17 is formed by a plate comprising a fastening O-shaped part 17a fixed by any suitable means to the first part 1a of the carrier 1, two connecting beams 17b extending, in the initial state of the carrier 1, perpendicular to the orientation X and forming a deformable parallelogram, a so-called pressing part 17c integral with the ends of the connecting beams 17b, and an actuating beam 17d extending from the pressing part 17c and carrying, at its free end, a movable tooth 17e. Particularly, the pressing part 17c is located above the second part 1b of the carrier 1 and has a longitudinal edge 17f facing the edge of the disk-shaped part 16a. Recesses will advantageously be provided corresponding with the pressing part 17c and the section of the disk-shaped part 16a facing the edge 17f, in a similar way to the prior art described above.

The measuring assembly 19 is similar to the measuring assembly 13 and thus comprises a toothed wheel 19a and a non-return device (not shown). In the initial state of the carrier 1, the movable tooth 17e is located between two teeth 19b of the toothed wheel 19a.

In the event of a cycle of tension load on the sensor $C_{21}$, the first and second parts 1a, 1b of the carrier 1 will move to the left and to the right, respectively, and thus the disk-shaped part 16a will push the edge 17f of the pressing part 17c and move the latter, and thus the actuating beam 17d, to the right by deforming the deformable parallelogram constituted by the connecting beams 17b, thereby rotating the toothed wheel 19a in the direction indicated by the arrow, in the same way as that described above. When returning to the initial position of the sensor $C_{21}$, the toothed wheel 19a is prevented from rotating by the non-return device.

In the event of a cycle of compression load, the eccentric piece 16 will first be spaced from the pressing part 17c, and then will return to the initial position of FIG. 10a, such that the toothed wheel 19a is not rotated.

Thus, this first variant is another example of structure of the actuating device enabling to count only the cycles of tension loads.

The eccentric piece 16 could be replaced with a simple plate having a push part similar to those of the second embodiment. However, the interest of such eccentric piece 16 is that it enables to set the offset distance easily, and thus the amplitude threshold level from which a load cycle will be counted.

Indeed, a rotation of the eccentric piece 16 around the pin 18, the grasping of the eccentric piece 16 being facilitated by the tab 16b, increases or decreases the distance between the edge of the disk-shaped part 16a and the edge 17f of the pressing part 17c. For example, with a same configuration of the carrier 1, and particularly a same position of the pin 18, the intermediary assembly 17 and the measuring assembly 19, it will just be necessary, when installing the eccentric piece 16, to set the angular position of the latter at a value enabling to achieve the desired offset distance.

Microengraved marks could thus be provided on the visible face of the disk-shaped part 16a, with a given angular pitch which corresponds to a given movement of the edge of the disk-shaped part 16a and the edge 17f, from which is indicated a reference mark at which the disk-shaped part 16a is in contact with the pressing part 17c. It is then just necessary to dispose the disk-shaped part 16a in contact with the pressing part 17c, and then rotate the eccentric piece 16 by the number of marks corresponding to the movement allowing to achieve the desired offset distance, and then block the eccentric part 16 in position, for example by bonding, as well known in the art.

The disk-shaped part 16a could also be disposed directly in the correct angular position by microrobotic means.

Figure 11A:
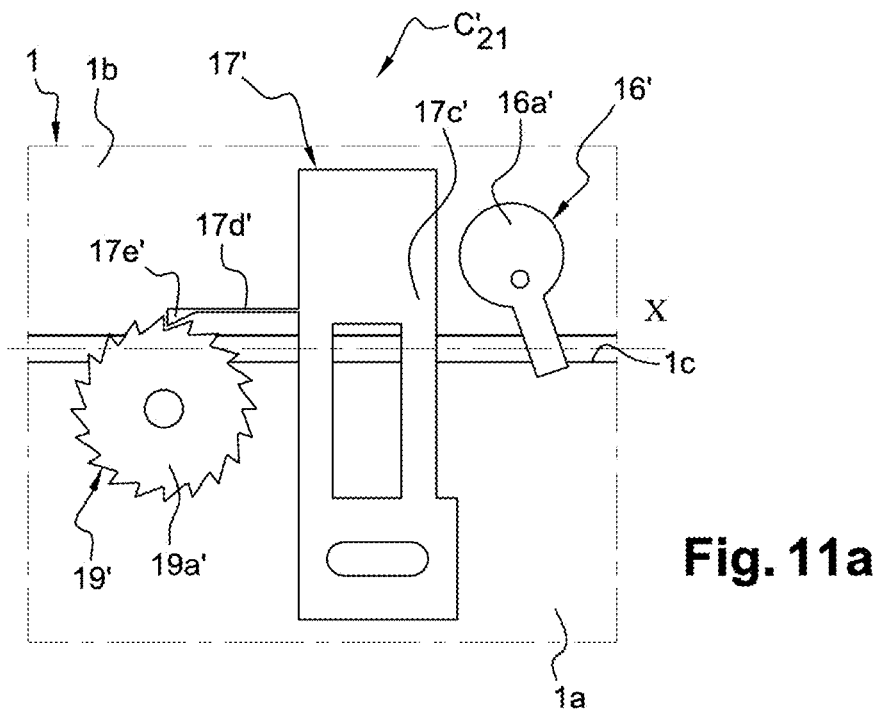
FIGS. 11a and 11b are views similar to FIGS. 10a and 10b, showing a part of a sensor according to the first variant, for counting cycles of compression loads.
Figure 11B:
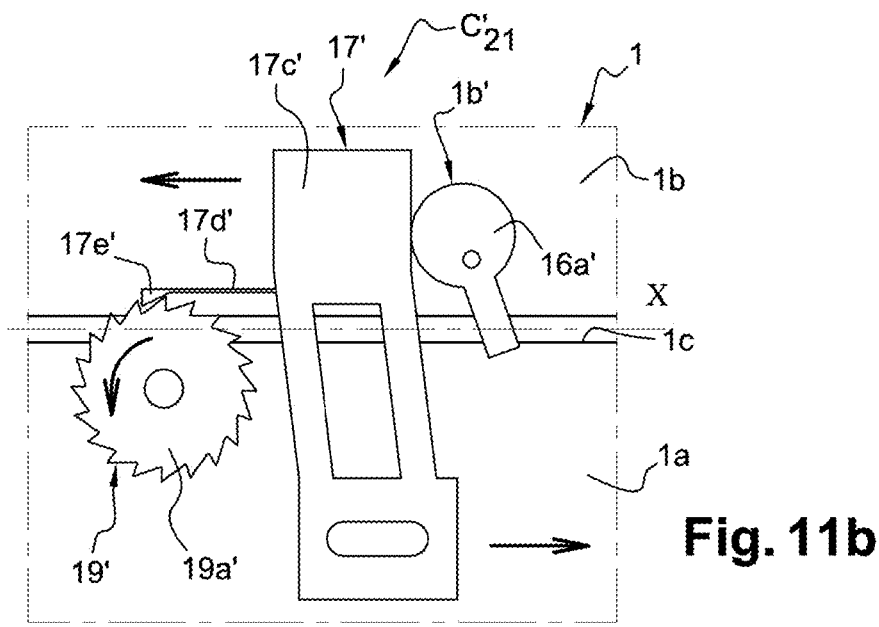

As it can be seen in FIGS. 11a and 11b, the structure of the actuating device of this first variant is also applicable to a sensor $C_{21}'$ for counting the cycles of compression loads.

As previously, the eccentric piece 16', the intermediary assembly 17' and the measuring assembly 19' of the sensor $C_{21}'$ are symmetrical to the eccentric piece 16, the intermediary assembly 17 and the measuring assembly 19, respectively, with respect to a median plane perpendicular to the orientation X and the carrier 1.

If referring particularly to FIG. 11b, it can be seen, when the carrier 1 is subjected to a compression load, that the disk-shaped part 16a' pushes the pressing part 17c' and thus moves the actuating beam 17d' and the movable tooth 17e' so as to rotate the toothed wheel 19a' in the direction indicated by the arrow. The toothed wheel 19a' is still retained in position by the non-return device (not shown) when the carrier 1 returns to the initial state. It is easy to understand that a cycle of tension load will not be counted by the toothed wheel 19a'.

Again, the eccentric piece 16' enables to set the offset distance between itself and the pressing part 17c', and thus to set the amplitude threshold level from which the cycle of compression load will be counted.

Second Variant of the Second Embodiment

Figure 12A:
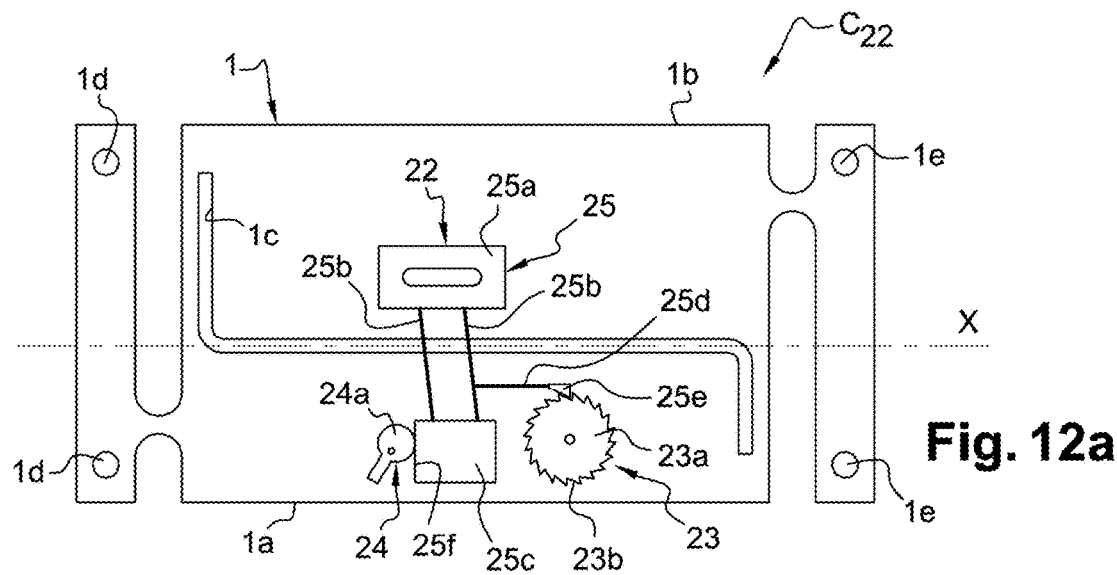
FIGS. 12a, 12b and 12c are views similar to FIGS. 8a, 8b and 8c, showing a sensor according to a second variant of the second embodiment.
Figure 12B:
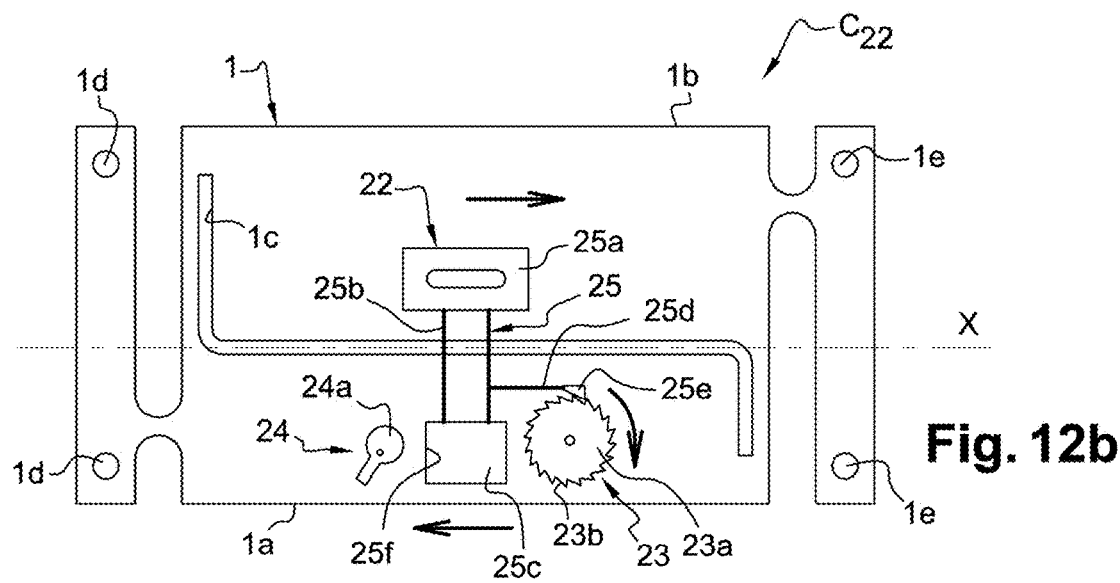
Figure 12C:
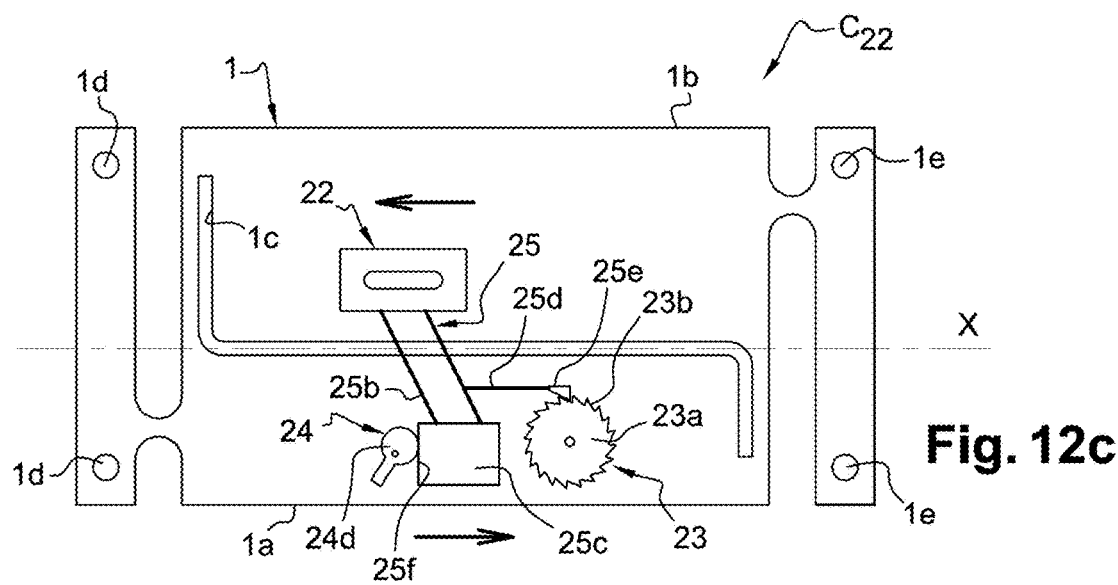

If referring now to FIGS. 12a-12c, it can be seen that a sensor $C_{22}$ according to a second variant of the second embodiment is shown, and that the sensor $C_{22}$ differs from the sensor $C_{21}$ according to the first variant in that the actuating assembly is here integral with the first part 1a of the carrier 1 and in that the intermediary assembly is integral with the second part 1b of the carrier 1.

The actuating device 22 thus comprises, on one hand, an actuating assembly formed by an eccentric piece 24 identical to the eccentric piece 16, 16', but fixed to the first part 1a of the carrier 1 and, on the other hand, an intermediary assembly 25 comprising a rigid O-shaped fixing part 25a fixed by any suitable means to the second part 1b of the carrier 1, two connecting beams 25b extending from the fixing part 25a extending, in the initial state of the carrier 1, perpendicular to the orientation X and forming a deformable parallelogram, a so-called pressing part 25c integral with the ends of the connecting beams 25b, and an actuating beam 25d extending from one of the connecting beams 25b and carrying, at its free end, a movable tooth 25e. Particularly, the end region of the connecting beams 25b and the pressing part 25c are located above the first part 1a of the carrier 1 and the pressing part has a longitudinal edge 25f facing the edge of the disk-shaped part 24a. Recesses will advantageously be provided corresponding with the connecting beams 25b, the pressing part 25c and the section of the disk-shaped part 24a facing the edge 25f, in a similar way to the prior art described above.

The eccentric piece 24 is located between the pressing part 25c and the anchoring region 1d.

The measuring assembly 23 is similar to the measuring assembly 13 and thus comprises a toothed wheel 23a and a non-return device (not shown).

A specificity of this variant is that, in the initial state, the eccentric piece 24 bears against the pressing part 25c and the deformable parallelogram constituted by the connecting beams 25b is already deformed. The toothed wheel 23a and the intermediary assembly 25 are configured such that, in this initial state, the movable tooth 25e is located between two teeth 23b of the toothed wheel 23a.

If referring to FIG. 12b, it can be seen that, in the event of a tension load, the eccentric piece 24 will move to the left while the fixing part 25a will move to the right, thereby causing a loss of contact between the eccentric piece 24 and the pressing part 25c after a deformation corresponding to the amplitude threshold level, as explained below. If the deformation continues after this loss of contact, the movable tooth 25e will push on a tooth 23b and rotate the toothed wheel 23a. It can be noted that the connecting beams 25b will be rigid enough to withstand the force applied by the tooth 23b on the movable tooth 25e, and thus effectively enable a rotation of the toothed wheel 23a. When returning to the initial state, the toothed wheel 23a is prevented from rotating by a non-return device (not shown).

If referring now to FIG. 12c, it can be seen that, in the event of a cycle of compression load, the first and second parts 1a, 1b of the carrier 1 will move to the right and to the left, respectively, the eccentric piece 24 will further deform the connecting beams 25b but, as the distance between the eccentric piece 24 and the toothed wheel 23a remains unchanged, this deformation does not result in a movement of the actuating beam 25d, and thus of the movable tooth 25e, with respect to the toothed wheel 23a, such that the latter does not rotate.

The configuration of the structure of the actuating device 22 and the measuring assembly 23 according to this second variant of the second embodiment thus also enables to count only the cycles of tension loads.

Obviously, this configuration could be applied to a sensor for counting the cycles of compression loads, simply by providing a structure which is symmetrical to that of FIG. 12a with respect to a median plane perpendicular to the orientation X and the carrier 1.

This configuration also enables to define, if desired, an offset of the amplitude threshold level from which a cycle of tension or compression load will be counted.

Indeed, if it is desirable to count all load cycles, from a deformation amplitude which is equal to the pitch of the toothed wheel 23a, it is just necessary to install the eccentric piece 24 and the intermediary assembly 25 such that, in the initial state, the eccentric piece 24 is just in contact with the pressing part 25c, without deforming the connecting beams 25b. In this case, the actuating beam 25d will rotate the toothed wheel 23a as soon as the amplitude of the deformation to which the carrier 1 is subjected is equal to the pitch of the toothed wheel 23a.

If it is desirable to count only the load cycles higher than a given value, thus a given value of the amplitude of the strain to which the carrier 1 is subjected, it is just necessary to install the eccentric piece 24 and the intermediary assembly 25 such that, in the initial state, the connecting beams 25b are deformed at such a value that they return to their non-deformed position only after a first deformation of the carrier 1, as represented in FIGS. 12a and 12b. The more the deformation of the connecting beams 25b is, the larger the distance to be traveled by the eccentric piece 24 to lose the contact with the pressing part 25c is, and the longer the delay of the actuating of the toothed wheel 23a by the actuating beam 25d will be.

Third Variant of the Second Embodiment

Figure 13A:
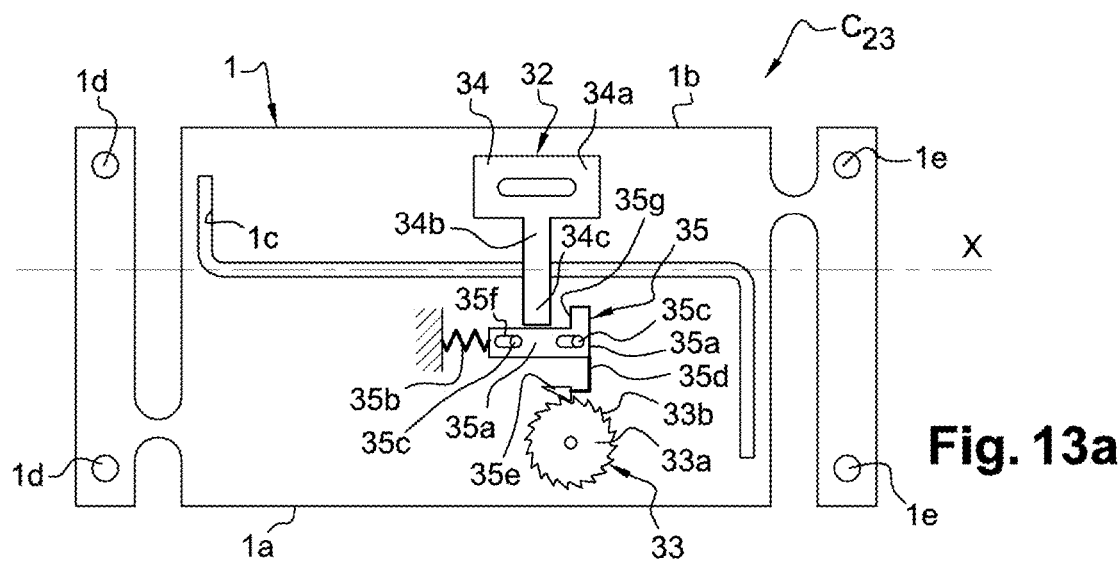
FIGS. 13a, 13b and 13c are views similar to FIGS. 8a, 8b and 8c, showing a sensor according to a third variant of the second embodiment.
Figure 13B:
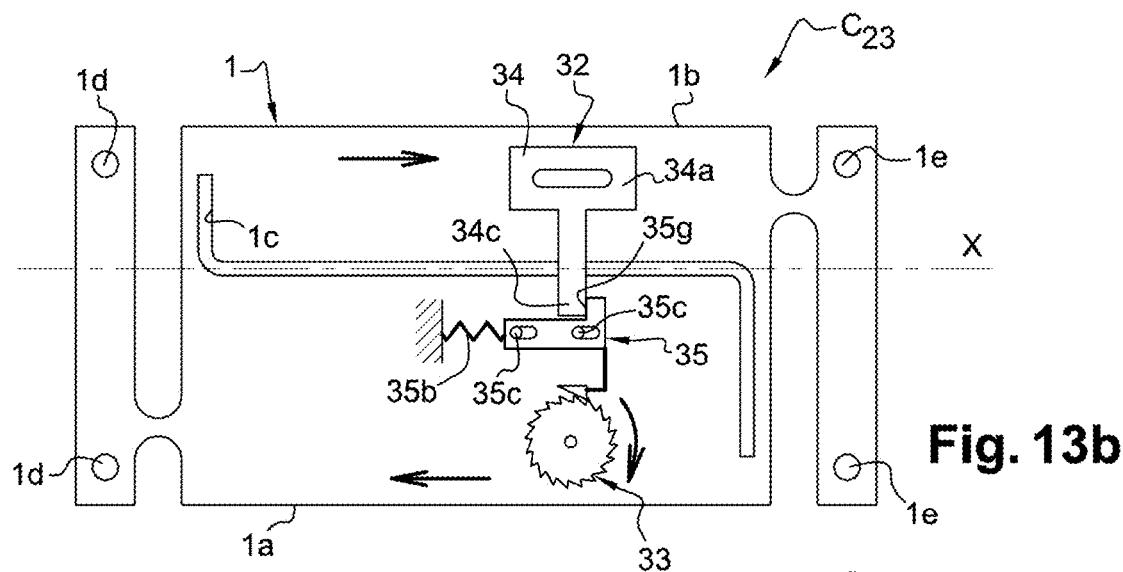
Figure 13C:
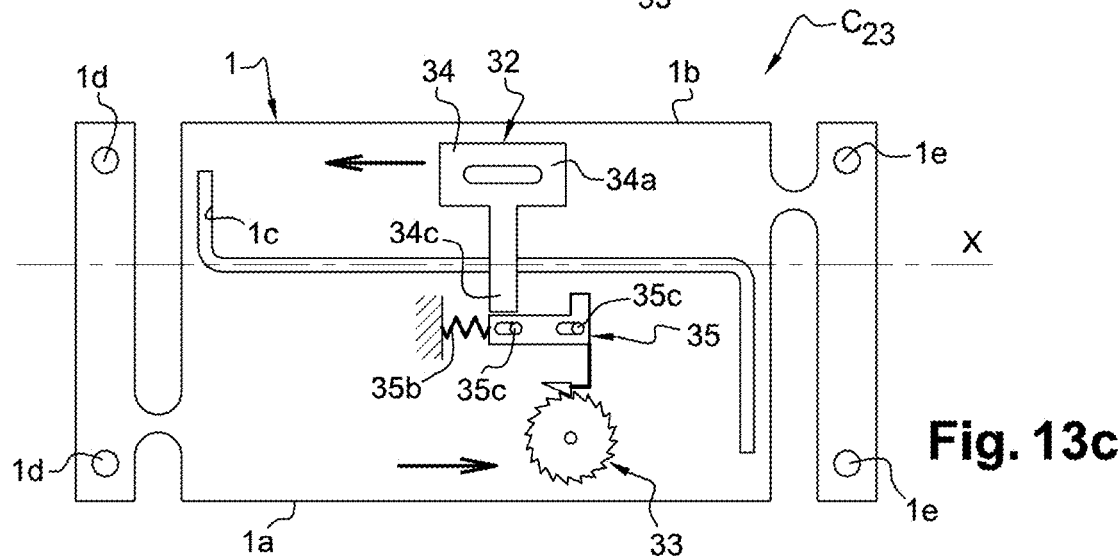

If referring now to FIGS. 13a-13c, it can be seen that a sensor $C_{23}$ according to a third variant of the second embodiment is shown, comprising an actuating device 32 and a measuring assembly 33.

The actuating device 32 comprises an actuating assembly 34 and an intermediary assembly 35.

The actuating assembly 34 is similar to the actuating assembly 14, and thus comprises a rigid fixing part 34a fixed to the second part 1b of the carrier 1, a beam 35b extending from the fixing part 34a and above the first part 1a of the carrier 1, ending by an end region forming a push part 35c.

The intermediary assembly 35 comprises an intermediary piece 35a, a tension spring 35b one end of which is secured to the first part 1a of the carrier 1, and the other end of which abuts against a side of the intermediary piece 35a, means 35c for guiding the movement of the intermediary piece 35a, and an actuating beam 35d one end of which, folded a right angle, carries a so-called movable tooth 35e.

The intermediary piece 35a is L-shaped, two oblong holes 35f, with a longitudinal orientation parallel to the orientation X, being distributed in the longitudinal section of the intermediary piece 35a, the base of the L being opposite the spring 35b and directed towards the second part 1b of the carrier 1, thereby providing a face 35g directed towards the anchoring region 1d of the first part 1a of the carrier 1. The guiding means 35c are formed by two pins extending from the first part 1a of the carrier 1 and through a respective oblong hole 35f.

The actuating beam 35d extends, from the angle between the base and the longitudinal section of the L formed by the intermediary piece 35a, towards the anchoring region 1d. The movable tooth 35e is directed in the same manner as the tooth 15e of the sensor $C_2$ according to the second embodiment.

The actuating assembly 34 and the intermediary piece 35 are positioned such that, in the initial state, the push part 34c is spaced from the face 35g of the intermediary piece 35a, and that the movable tooth 35e is located between two teeth 33b of the toothed wheel 33a.

If referring to FIG. 13b, it can be seen that, in the event of a cycle of tension load on the sensor $C_{23}$, the first and second parts 1a, 1b of the carrier 1 will move to the left and to the right, respectively, and thus the push part 34c will push the face 35g of the intermediary piece 35a and move the latter, and thus the movable tooth 35e, to the right, thereby rotating, in the direction indicated by the arrow, the toothed wheel 33a which is also moved to the left. When the sensor $C_{23}$ returns to the initial position, the toothed wheel 33a is prevented from rotating by the non-return device (not shown).

If referring to FIG. 13c, it can be seen that, in the event of a cycle of compression load, the push part 34c will move away from the face 35g of the intermediary piece 35a and, due to the L shape of the latter, the push part 34c will not act on the intermediary piece 35a. Thus, the latter will remain stationary with respect to the toothed wheel 33a, such that the cycle of compression load will not be counted.

Obviously, this configuration could be applied to a sensor for counting the cycles of compression loads, simply by providing a structure which is symmetrical to that of FIG. 13a with respect to a median plane perpendicular to the orientation X and the carrier 1.

This configuration also enables to define, if desired, an offset of the amplitude threshold level from which a cycle of tension or compression load will be counted.

Indeed, if it is desirable to count all load cycles, from a deformation amplitude which is equal to the pitch of the toothed wheel 33a, it is just necessary to install the actuating assembly 34 and the intermediary piece 35a such that, in the initial state, the push part 34c is just in contact with the face 35g, without pushing it. In this case, the actuating beam 35d will rotate the toothed wheel 33a as soon as the amplitude of the deformation to which the carrier 1 is subjected is equal to the pitch of the toothed wheel 33a.

If it is desirable to count only the load cycles higher than a given value, thus a given value of the amplitude of the deformation to which the carrier 1 is subjected, it is just necessary to install the actuating assembly 34 such that, in the initial state, the push part 34c is spaced from the face 35g of the intermediary piece 35a, this distance being equal to the offset distance of the deformation amplitude threshold level from which the load cycle will be counted by the toothed wheel 33a.

Third Embodiment: Measuring Tension Loads and Compression Loads Using the Same Sensor, with Discrimination If referring now to FIG. 14, a schematic view of a sensor $C_3$ according to a third embodiment of the present invention is shown, comprising an actuating device 42 and two measuring assemblies 43.

The actuating device 42 comprises an actuating assembly 44 and an intermediary assembly 45.

The actuating assembly 44 is identical to the actuating assembly 4 of the sensor $C_1$ according to the first embodiment, and thus comprises an O-shaped fixing part 44a, fixed to the second part 1b of the carrier 1, and a beam 44b extending above the first part 1a of the carrier 1, but differs in that it comprises two push parts 44c and 44c', one on either side of the free end of the beam 44b. As it is easy to understand, the push part 44c corresponds to the push part 4c of the sensor $C_1$ and the push part 44c' corresponds to the push part 4c' of the sensor $C_1$'.

The intermediary assembly 45 is composed of a combination of the intermediary assemblies of the sensors $C_1$ and $C_1$': it comprises an O-shaped fixing part 45a, fixed to the first part 1a of the carrier 1, from which extend first and second intermediary sub-assemblies $45_1$ and $45_2$, respectively, on the anchoring region 1e side of the second part 1b and the anchoring region 1d side of the first part 1a of the carrier, each comprising two connecting beams 45b/45b', an actuating beam 45c/45c' and a movable tooth 45e/45e' identical to the actuating beams 5b/5b', the actuating beam 5c/5c' and the movable tooth 4e/4e' of the sensor $C_1/C_1$'.

The measuring assembly 43 comprises first and second measuring sub-assemblies $43_1$ and $43_2$ corresponding, respectively, to the measuring assemblies 3 and 3' of the sensors $C_1/C_1$', and thus comprising a fixing part 43a, 43a' and a fixed tooth 43b, 43b', respectively, on the same axis as the movable tooth 45e, 45e', respectively.

The first intermediary sub-assembly $45_1$ and the first measuring sub-assembly $43_1$ cooperate in the same way as the intermediary assembly 5 and the measuring assembly 3 of the sensor $C_1$, for a measurement of tension load, while the second intermediary sub-assembly $45_2$ and the second measuring sub-assembly $43_2$ cooperate in the same way as the intermediary assembly 5' and the measuring assembly 3' of the sensor $C_1$', for a measurement of compression load.

It is easy to understand that in the event of a tension load on the sensor $C_3$, the push part 44c will push the actuating beam 45c and, if the amplitude of the deformation of the carrier 1 is higher than the measurement threshold amplitude, the movable tooth 45e will be retained by the fixed tooth 43b while the push part 44c' will be moved away from the actuating beam 45c'. On the contrary, in the event of a compression load on the sensor $C_3$, the opposite will occur and the movable tooth 45e' will be retained by the fixed tooth 43b'.

The sensor $C_3$ according to the third embodiment thus enables to determine if the sensor $C_3$, and thus the structure to be monitored, has been subjected to a load higher than a threshold value, whether the load is a compression load or a tension load. This is particularly advantageous in the cases where it is not possible to dispose several sensors on a specific area of the structure to be monitored, for example because it has a small size.

It is easy to understand that it is here again possible to set the measurement threshold amplitude by setting the distance between the push parts 44c, 44c' and the actuating beams 45c, 45c'.

This combination of the detection systems on a single sensor can be generalized to all of the actuating devices and measuring assemblies described above.

Figure 15:
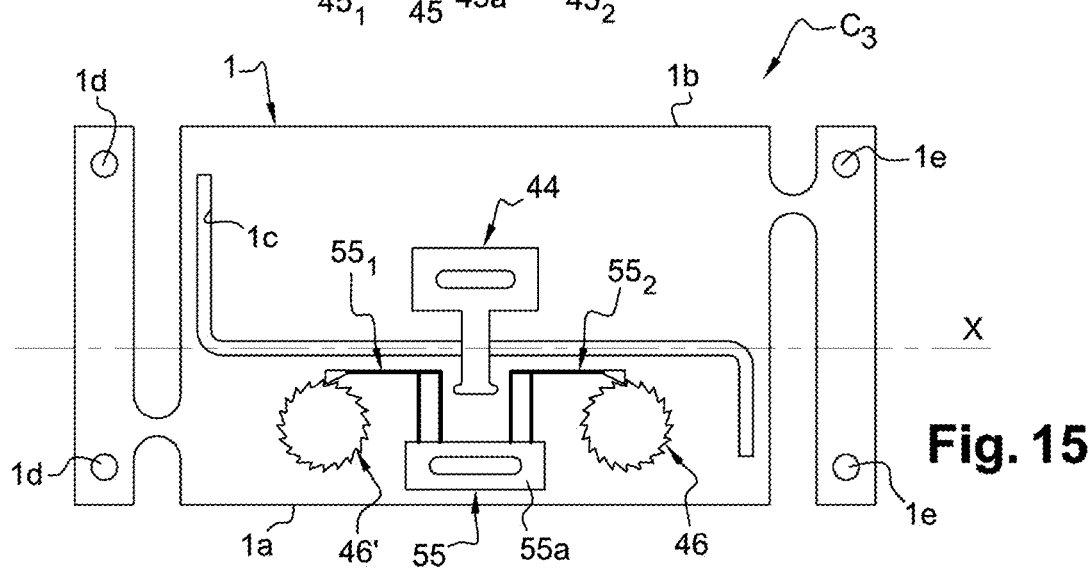
FIGS. 15 and 16 are views similar to FIG. 14, showing a sensor according to first and second variants of the third embodiment, respectively.

FIG. 15 thus shows a sensor $C_{31}$ according to a first variant of the third embodiment, which has an actuating device comprising the actuating assembly 44 and an intermediary assembly 55 comprising a fixing part 55a identical to the fixing part 45a and first and second intermediary sub-assemblies $55_1$ and $55_2$ identical, respectively, to that formed by the two connecting beams 15*b*, the actuating beam 15*d* and the movable tooth 15*e* of the sensor C₂ of the second embodiment (FIGS. 8*a*-8*c*), and to that formed by the connecting beams, the actuating beam 15*d*' and the movable tooth 15*e*' of the sensor C₂' (FIG. 9).

The measuring sub-assemblies $43_1$, $43_2$ are replaced with toothed wheel-based measuring sub-assemblies 46, 46' corresponding to the measuring assemblies 13 and 13', respectively, of the second embodiment and its variant (FIGS. 8*a*-9). The non-return devices are not shown.

It is also easy to understand that, again, in the event of a cycle of tension load, the first intermediary sub-assembly $55_1$ will actuate the measuring assembly 46 for counting a cycle, and the second intermediary sub-assembly $55_2$ will not actuate the measuring assembly 46'. The opposite occurs in the event of a cycle of compression load.

Figure 14:
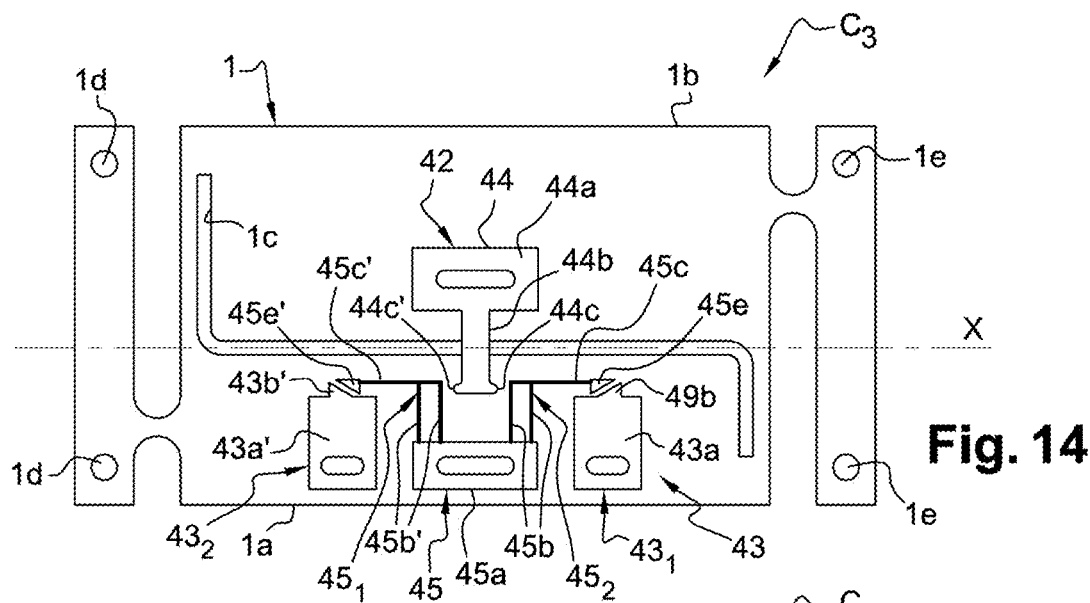
FIG. 14 is a top schematic view of a sensor according to a third embodiment, in the initial state.
Figure 16:
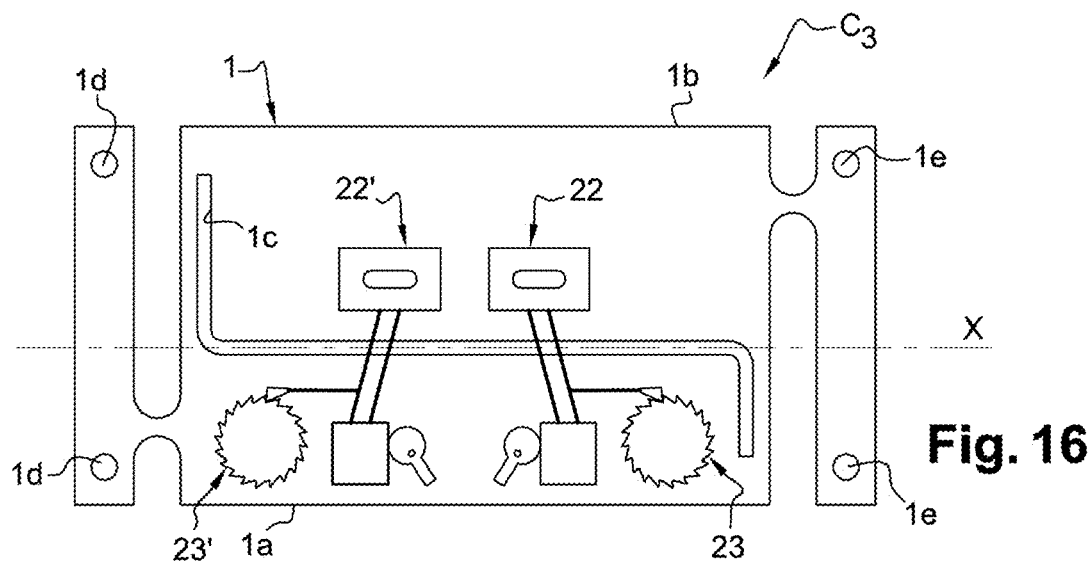

In both examples of FIGS. 14 and 15, only one fixing part is used for connecting the actuating sub-assemblies to the first part 1*a* of the carrier 1. It is also possible to simply install, on the carrier 1, two detection systems according to the present invention, one being arranged for the measurement of tension loads and the other being arranged for the measurement of compression loads. FIG. 16 shows an example of such an implementation with a detection system according to the second variant of the second embodiment (FIGS. 12*a*-12*c*). Thus, an actuating device 22 and a measuring assembly 23 have been installed on the anchoring region 1*e* side of the second part 1*b* of the carrier 1, and an actuating device 22' and a measuring assembly 23' have been installed on the anchoring region 1*d* side of the first part 1*a* of the carrier 1 and are symmetrical to the actuating device 22 and the measuring assembly 23.

Of course, said embodiments of the present invention are given for indicative and non-limiting purposes, and modifications could be made without departing from the scope of the present invention.

Figure 2A:
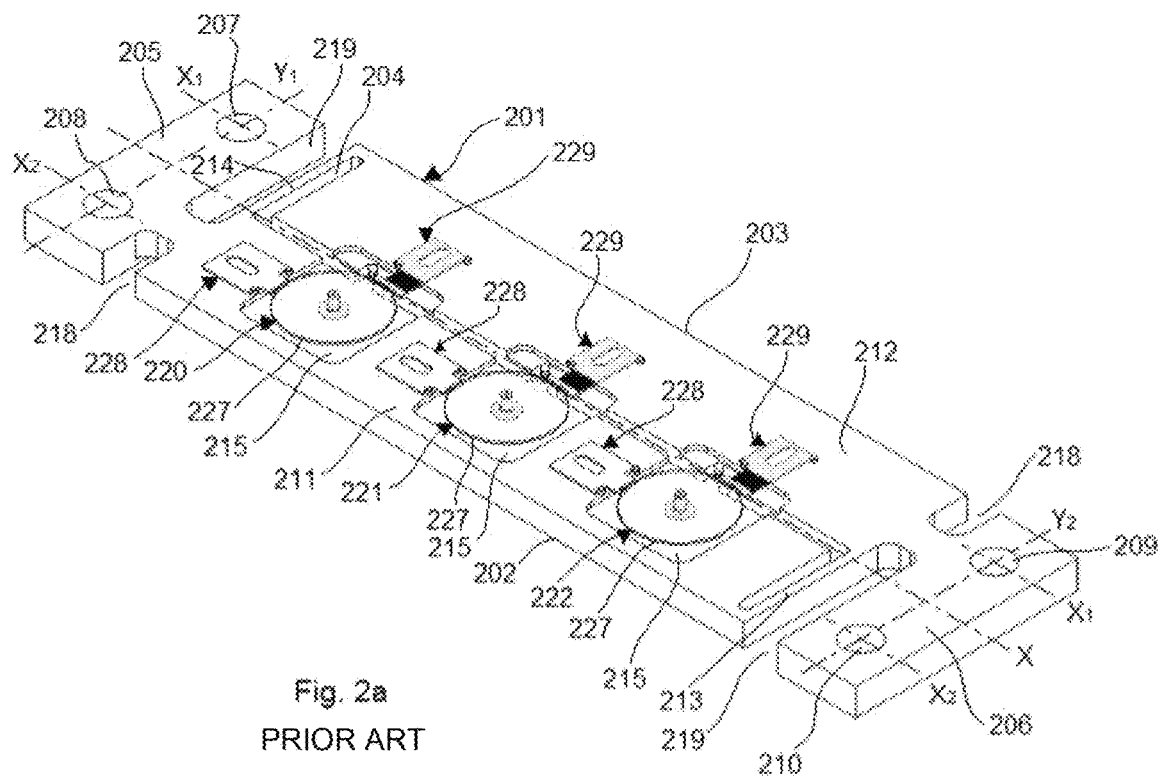
FIG. 2a is a perspective view of a reversible and passive sensor for counting the number of load cycles with discrimination between at least two different thresholds of load cycles, according to a second prior art.
Figure 2B:
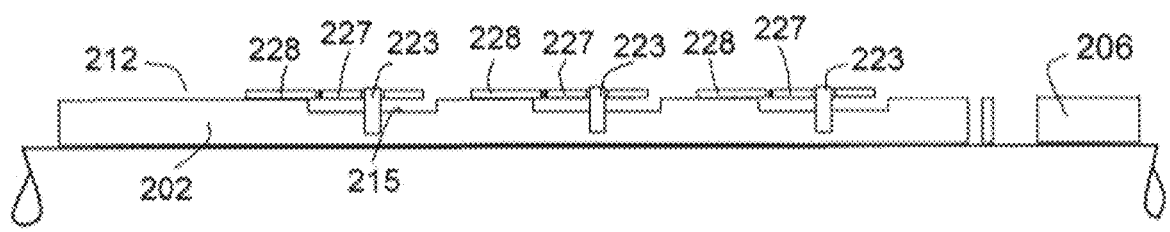
FIG. 2b is a longitudinal sectional view of FIG. 2a, this sensor being fixed to a structure to be monitored.
Figure 2C:
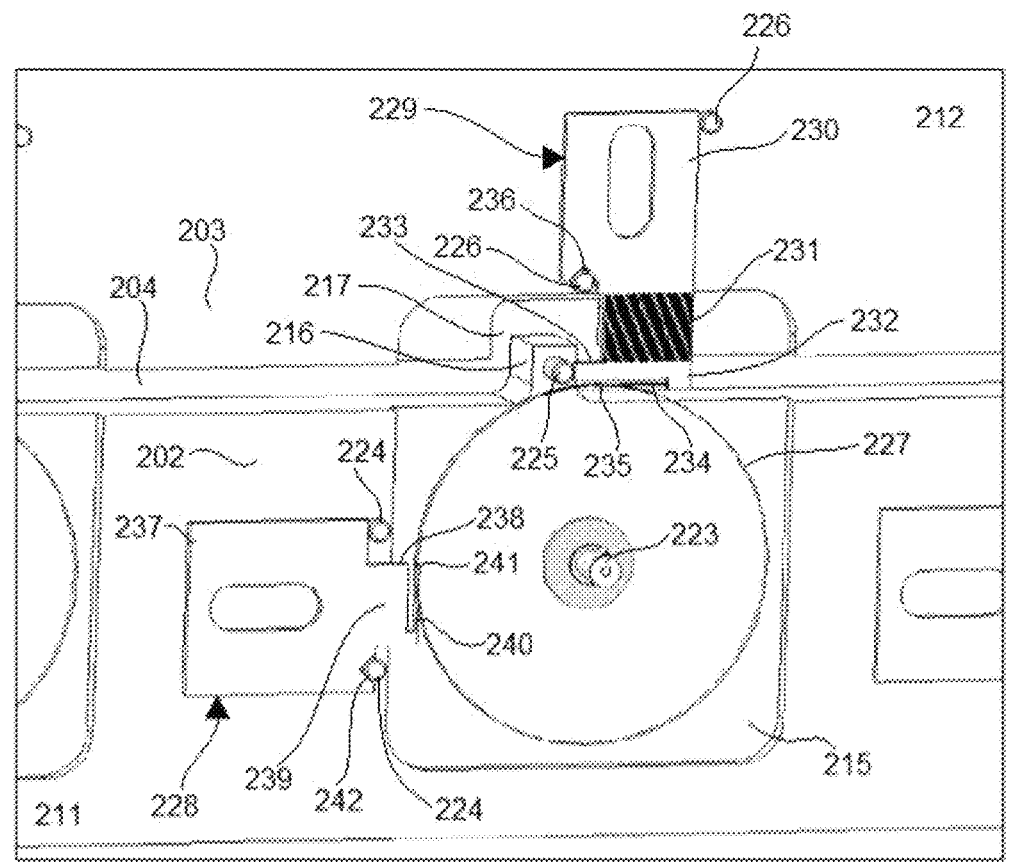
Figure 2D:
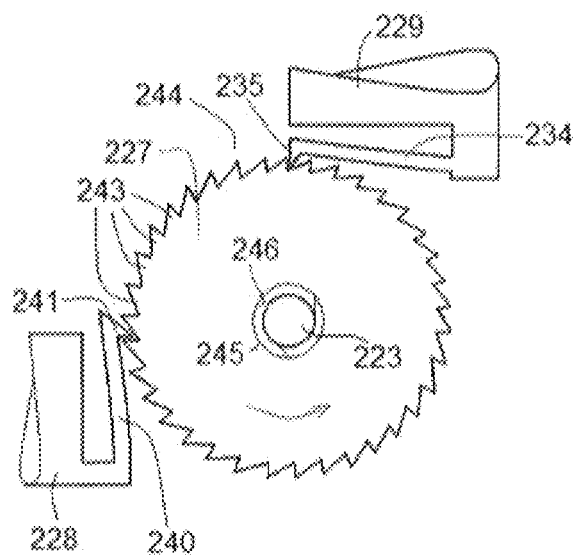
FIG. 2d is a partial detailed diagram of the detection and counting device of FIG. 2c.

Therefore, for example, in the case of an application for counting the number of load cycles, a device for restraining the actuating of the toothed wheel could advantageously be provided. This restraining device could be similar to that of the French patent FR2974410 B1. If the first variant of the second embodiment (FIGS. 10*a* and 10*b*) is taken as an example, this restraining device could consist in a rigid beam extending parallel to the actuating beam 17*d*, at the vicinity of the latter, on the side opposite the toothed wheel 19*a*, and a pin integral with the first part 1*a* of the carrier 1 and arranged at a position similar to that shown in FIG. 2*c*. Thus, it can be ensured that a movement longer than the pitch P of the toothed wheel causes a rotation of the toothed wheel only by an angle corresponding to a single tooth.

The invention claimed is:

1. A passive sensor for deformation(s) to which a structure is subjected along a so-called measurement orientation, the sensor comprising a detection system for detecting a variation in a distance between two points or regions of a structure, and a carrier having a first part and a second part configured to be fixed respectively to one of said two points or regions of the structure such that, when one of the first and second parts moves in a direction along the measurement orientation, the other of the first and second parts moves in the opposite direction, the detection system comprising:

a deformation measuring assembly carried by the first part of the carrier and actuatable only in one direction, so-called measurement direction, of the measurement orientation, in order to measure and store one among the amplitude of the deformation and the number of deformation cycles, an actuating device comprising an actuating member which is movable along the measurement orientation and is configured to actuate the deformation measuring assembly when the actuating member is moved in the measurement orientation, as a result of a relative movement between the first and second parts of the carrier, wherein the actuating device comprises:

an intermediary assembly comprising:
a fixing part using which the intermediary assembly is carried by the first part of the carrier,
the actuating member, and
an elastic connection between the fixing part and the actuating member, and an actuating assembly which is integral with the second part of the carrier and which has a so-called push part which is directed in the measurement direction, the actuating assembly being configured such that the push part faces the intermediary assembly so as to apply thereon a push in the measurement direction when the second part of the carrier moves in the measurement direction, thereby moving the actuating member in the measurement direction in order to actuate the deformation measuring assembly, but so as not to exert any action on the intermediary assembly when the second part of the carrier moves in a second direction opposite the measurement direction, whereby the deformation measuring assembly will be actuated only when the second part of the carrier moves in the measurement direction, thereby allowing a measurement discrimination between the sensor being subjected to a tension load and the sensor being subjected to a compression load.

2. The sensor according to claim 1, wherein the deformation measuring assembly comprises at least one fixed tooth and the actuating member comprises at least one so-called movable tooth, the or each fixed tooth providing a retaining face directed in the measurement direction and configured to enable a movement of the one or several movable teeth beyond said fixed tooth as a result of a movement of the second part of the carrier in the measurement direction, but to retain the or one of the movable teeth when the actuating member moves in the second direction under the action of the elastic connection, after having moved beyond said fixed tooth.

3. The sensor according to claim 2, wherein the deformation measuring assembly comprises several fixed teeth, spaced from each other in the measurement direction and in an orientation orthogonal to the measurement direction, and the actuating member comprises several movable teeth also spaced from each other such that each movable tooth is located on the axis of a corresponding fixed tooth, the movable teeth being spaced from each other by a first pitch and the fixed teeth being spaced from each other by a second pitch, at least of the first and second pitches being smaller than the length of the teeth to which it relates.

4. The sensor according to claim 2, wherein the actuating member is formed by at least one so-called actuating beam, the at least one actuating beam comprising at least one movable tooth, and the elastic connection comprises at least two parallel connecting beams each having a first end integral with the fixing part and a second end integral with the at least one actuating beam, the at least two connecting beams forming a deformable parallelogram.

5. The sensor according to claim 1, wherein the deformation measuring assembly is a toothed wheel rotatably mounted on the first part of the carrier and the actuating member is formed by a so-called actuating beam comprising, in an end region, at least one tooth extending between two teeth of the toothed wheel so as to constitute a gear with the teeth of the toothed wheel.

6. The sensor according to claim 5, wherein the actuating assembly extends in a cantilever manner above the first part of the carrier, the end region of the actuating assembly that is cantilevered having the push part.

7. The sensor according to claim 6, wherein the intermediary assembly is formed by an intermediary piece comprising, on one hand, at least one tooth extending between two teeth of the toothed wheel so as to constitute a gear with the teeth of the toothed wheel and, on the other hand, a recess in which the push part of the actuating assembly extends, the recess having a pressing face opposite the push part and preferably spaced from the push part.

8. The sensor according to claim 5, wherein the intermediary assembly comprises, extending from the end of the elastic connection opposite the fixing part of the intermediary assembly, a pressing part which is cantilevered above the second part of the carrier and against which the push part will apply a push in case the second part of the carrier moves in the measurement direction.

9. The sensor according to claim 8, wherein the actuating assembly comprises a disk-shaped part the outer edge of which constitutes the push part, the disk-shaped part being mounted so as to be rotatable around a rotation axis which is offset with respect to the center of the disk-shaped part, such that a rotation of the disk-shaped part enables to vary the distance between the push part and the pressing part of the intermediary assembly.

10. The sensor according to claim 1, wherein it comprises a second deformation measuring assembly carried by the first part of the carrier and actuatable only in a second measurement direction, opposite the first measurement direction, in order to measure and store one among the amplitude of a deformation and the number of deformation cycles, and wherein the actuating device comprises:
a second intermediary assembly comprising:
a second fixing part using which the second intermediary assembly is carried by the first part of the carrier,
a second actuating member movable along the measurement orientation and configured to actuate the second deformation measuring assembly when the second actuating member is moved in the second measurement direction, and
a second elastic connection between the second fixing part and the second actuating member, and
a second actuating assembly integral with the second part of the carrier and having a second push part which is directed in the second measurement direction, the second actuating assembly being configured such that the second push part faces the second intermediary assembly so as to apply thereon a push in the second measurement direction when the second part of the carrier moves in the second measurement direction, thereby moving the second actuating member in the second measurement direction in order to actuate the second deformation measuring assembly, but so as not to apply any action on the second intermediary assembly when the second part of the carrier moves in the first measurement direction,
whereby the second deformation measuring assembly will be actuated only when the second part of the carrier moves in the second measurement direction, thereby enabling the sensor to measure a deformation due to a tension load on the sensor or a deformation due to a compression load on the sensor, while discriminating them from each other.

11. The sensor according to claim 10, wherein:
the deformation measuring assembly comprises at least one fixed tooth and the actuating member comprises at least one so-called movable tooth, the or each fixed tooth providing a retaining face directed in the measurement direction and configured to enable a movement of the one or several movable teeth beyond said fixed tooth as a result of a movement of the second part of the carrier in the measurement direction, but to retain the one or more of the movable teeth when the actuating member moves in the second measurement direction under the action of the elastic connection, after having moved beyond said fixed tooth; and
the second deformation measuring assembly comprises at least one fixed tooth and the second actuating member comprises at least one so-called movable tooth, the or each fixed tooth providing a retaining face directed in the second measurement direction and configured to enable a movement of the one or several movable teeth beyond said fixed tooth as a result of a movement of the second part of the carrier in the second measurement direction, but to retain the one or more of the movable teeth when the second actuating member moves in the measurement direction under the action of the elastic connection, after having moved beyond said fixed tooth.

12. The sensor of claim 11, wherein:
the deformation measuring assembly comprises several fixed teeth, spaced from each other in the measurement direction and in an orientation orthogonal to the measurement direction, and the actuating member comprises several movable teeth also spaced from each other such that each movable tooth is located on the axis of a corresponding fixed tooth, the movable teeth being spaced from each other by a first pitch and the fixed teeth being spaced from each other by a second pitch, at least of the first and second pitches being smaller than the length of the teeth to which it relates; and
the second deformation measuring assembly comprises several fixed teeth, spaced from each other in the second measurement direction and in an orientation orthogonal to the second measurement direction, and the second actuating member comprises several movable teeth also spaced from each other such that each movable tooth is located on the axis of a corresponding fixed tooth, the movable teeth being spaced from each other by a third pitch and the fixed teeth being spaced from each other by a fourth pitch, at least of the third and fourth pitches being smaller than the length of the teeth to which it relates.

13. The sensor according to claim 10, wherein:
the deformation measuring assembly is a toothed wheel rotatably mounted on the first part of the carrier and the actuating member is formed by a so-called actuating beam comprising, in an end region, at least one tooth extending between two teeth of the toothed wheel so as to constitute a gear with the teeth of the toothed wheel; and
the second deformation measuring assembly is a toothed wheel rotatably mounted on the first part of the carrier and the second actuating member is formed by a so-called actuating beam comprising, in an end region, at least one tooth extending between two teeth of the toothed wheel so as to constitute a gear with the teeth of the toothed wheel.

14. The sensor according to claim 13, wherein:
wherein the intermediary assembly comprises, extending from the end of the elastic connection opposite the fixing part of the intermediary assembly, a pressing part which is cantilevered above the second part of the carrier and against which the push part will apply a push in case the second part of the carrier moves in the measurement direction, and the actuating assembly comprises a disk-shaped part the outer edge of which constitutes the push part, the disk-shaped part being mounted so as to be rotatable around a rotation axis which is offset with respect to the center of the disk-shaped part, such that a rotation of the disk-shaped part enables to vary the distance between the push part and the pressing part of the intermediary assembly; and
wherein the second intermediary assembly comprises, extending from the end of the second elastic connection opposite the second fixing part of the second intermediary assembly, a second pressing part which is cantilevered above the second part of the carrier and against which the second push part will apply a push in case the second part of the carrier moves in the second measurement direction, and the second actuating assembly comprises a disk-shaped part the outer edge of which constitutes the second push part, the disk-shaped part being mounted so as to be rotatable around a rotation axis which is offset with respect to the center of the disk-shaped part, such that a rotation of the disk-shaped part enables to vary the distance between the second push part and the second pressing part of the second intermediary assembly.

15. A passive sensor for deformation(s) to which a structure is subjected along a so-called measurement orientation, the sensor comprising a detection system for detecting a variation in a distance between two points or regions of a structure, and a carrier having a first part and a second part configured to be fixed respectively to one of said two points or regions of the structure such that, when one of the first and second parts moves in a direction along the measurement orientation, the other of the first and second parts moves in the opposite direction, the detection system comprising:
a deformation measuring assembly carried by the first part of the carrier and actuatable only in one direction, so-called measurement direction, of the measurement orientation, in order to measure and store one among the amplitude of the deformation and the number of deformation cycles,
an actuating device comprising an actuating member which is movable along the measurement orientation and is configured to actuate the deformation measuring assembly when the actuating member is moved in the measurement orientation, as a result of a relative movement between the first and second parts of the carrier,
wherein the actuating device comprises:
an intermediary assembly comprising:
a fixing part using which the intermediary assembly is carried by the second part of the carrier,
the actuating member, and
an elastic connection between the fixing part and the actuating member, and
an actuating assembly which is integral with the first part of the carrier and which has a so-called push part which is directed in the measurement direction, the actuating assembly being configured such that the push part faces the intermediary assembly so as not to exert any action thereon when the second part of the carrier moves in the measurement direction, the actuating member thus being moved together with the second part of the carrier in the measurement direction in order to actuate the deformation measuring assembly, but so as to apply a push on the intermediary assembly when the second part of the carrier moves in the direction opposite the measurement direction, in order to prevent any relative movement between the actuating member and the deformation measuring assembly,
whereby the deformation measuring assembly will be actuated only when the second part of the carrier moves in the measurement direction, thereby allowing a measurement discrimination between the sensor being subjected to a tension load and the sensor being subjected to a compression load.

16. The sensor according to claim 15, wherein the deformation measuring assembly is a toothed wheel rotatably mounted on the first part of the carrier and the actuating member is formed by a so-called actuating beam comprising, in an end region, at least one tooth extending between two teeth of the toothed wheel so as to constitute a gear with the teeth of the toothed wheel.

17. The sensor according to claim 16, wherein the intermediary assembly comprises, extending from the end of the elastic connection opposite the fixing part of the intermediary assembly, a pressing part which is cantilevered above the first part of the carrier and against which the push part will apply a push in case the second part of the carrier moves in the direction opposite the measurement direction, the push part being positioned so as to hold the actuating beam, against the return action of the elastic connection, in a position offset, in the measurement direction, from the position the actuating beam would occupy in the absence of the push part.

18. The sensor according to claim 17, wherein the actuating assembly comprises a disk-shaped part the outer edge of which constitutes the push part, the disk-shaped part being mounted so as to be rotatable around a rotation axis which is offset with respect to the center of the disk-shaped part, such that a rotation of the disk-shaped part enables to vary the distance between the offset position, in which the actuating beam is held, and the position it would occupy in the absence of the actuating assembly.

19. The sensor according to claim 15, wherein it comprises a second deformation measuring assembly carried by the first part of the carrier and actuatable only in a second measurement direction, opposite the first measurement direction, in order to measure and store one among the amplitude of a deformation and the number of deformation cycles, and wherein the actuating device comprises:
a second intermediary assembly comprising:
a second fixing part using which the second intermediary assembly is carried by the second part of the carrier,
a second actuating member movable along the measurement orientation and configured to actuate the second deformation measuring assembly when the second actuating member is moved in the second measurement direction, and
a second elastic connection between the second fixing part and the second actuating member, and
a second actuating assembly integral with the first part of the carrier and having a second push part which is directed in the second measurement direction, the second actuating assembly being configured such that the second push part faces the second intermediary assembly so as not to exert any action on the second intermediary assembly when the second part of the carrier moves in the second measurement direction, the second actuating member thus being moved together with the second part of the carrier in the second measurement direction in order to actuate the second deformation measuring assembly, but so as to apply a push on the second intermediary assembly when the second part of the carrier moves in the first measurement direction, in order to prevent any relative movement between the second actuating member and the second deformation measuring assembly, whereby the second deformation measuring assembly will be actuated only when the second part of the carrier moves in the second measurement direction, thereby enabling the sensor to measure a deformation due to a tension load on the sensor or a deformation due to a compression load on the sensor, while discriminating them from each other.

20. The sensor according to claim 19, wherein: —the deformation measuring assembly is a toothed wheel rotatably mounted on the first part of the carrier and the actuating member is formed by a so-called actuating beam comprising, in an end region, at least one tooth extending between two teeth of the toothed wheel so as to constitute a gear with the teeth of the toothed wheel, the intermediary assembly comprises, extending from the end of the elastic connection opposite the fixing part of the intermediary assembly, a pressing part which is cantilevered above the first part of the carrier and against which the push part will apply a push in case the second part of the carrier moves in the direction opposite the measurement direction, the push part being positioned so as to hold the actuating beam, against the return action of the elastic connection, in a position offset, in the measurement direction, from the position the actuating beam would occupy in the absence of the push part, and the actuating assembly comprises a disk-shaped part the outer edge of which constitutes the push part, the disk-shaped part being mounted so as to be rotatable around a rotation axis which is offset with respect to the center of the disk-shaped part, such that a rotation of the disk-shaped part enables to vary the distance between the offset position, in which the actuating beam is held, and the position it would occupy in the absence of the actuating assembly; and —the second deformation measuring assembly is a toothed wheel rotatably mounted on the first part of the carrier and the second actuating member is formed by a so-called actuating beam comprising, in an end region, at least one tooth extending between two teeth of the toothed wheel so as to constitute a gear with the teeth of the toothed wheel, the second intermediary assembly comprises, extending from the end of the second elastic connection opposite the second fixing part of the second intermediary assembly, a second pressing part which is cantilevered above the first part of the carrier and against which the second push part will apply a push in case the second part of the carrier moves in the direction opposite the second measurement direction, the second push part being positioned so as to hold the actuating beam, against the return action of the second elastic connection, in a position offset, in the second measurement direction, from the position the actuating beam would occupy in the absence of the second push part, and the second actuating assembly comprises a disk-shaped part the outer edge of which constitutes the second push part, the disk-shaped part being mounted so as to be rotatable around a rotation axis which is offset with respect to the center of the disk-shaped part, such that a rotation of the disk-shaped part enables to vary the distance between the offset position, in which the actuating beam is held, and the position it would occupy in the absence of the second actuating assembly.

* * * * *